(12) United States Patent
Kasper et al.

(10) Patent No.: US 12,424,931 B2
(45) Date of Patent: Sep. 23, 2025

(54) OPERATING PARAMETER POWER CONVERSION METHOD AND POWER CONVERTER

(71) Applicant: Infineon Technologies Austria AG, Villach (AT)

(72) Inventors: Matthias J. Kasper, Villach (AT); Jon Azurza Anderson, Villach (AT); Gerald J. Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 242 days.

(21) Appl. No.: 18/106,253

(22) Filed: Feb. 6, 2023

(65) Prior Publication Data

US 2023/0308012 A1    Sep. 28, 2023

(30) Foreign Application Priority Data

Mar. 7, 2022    (EP) .................................. 22160572

(51) Int. Cl.
*H02M 1/42*    (2007.01)
*H02M 1/00*    (2006.01)
(Continued)

(52) U.S. Cl.
CPC ....... *H02M 1/4208* (2013.01); *H02M 1/0058* (2021.05); *H02M 1/0067* (2021.05);
(Continued)

(58) Field of Classification Search
CPC ............. H02M 1/4208; H02M 1/0067; H02M 1/0058; H02M 7/217; H02M 3/33567;
(Continued)

(56) References Cited

U.S. PATENT DOCUMENTS

| 2010/0026095 | A1 | 2/2010 | Phadke |
| 2014/0307483 | A1 | 10/2014 | Sigamani et al. |
| 2018/0309372 | A1* | 10/2018 | Leong ............... H02M 3/33546 |

FOREIGN PATENT DOCUMENTS

| EP | 1501176 A2 | 1/2005 |
| EP | 1501176 A3 | 6/2006 |
| JP | 6968315 B1 | 11/2021 |

OTHER PUBLICATIONS

EP Extended Search Report, EP 22 16 0572, pp. 1-8, Aug. 16, 2022.
(Continued)

*Primary Examiner* — Rafael O De Leon Domenech
(74) *Attorney, Agent, or Firm* — Armis IP Law, LLC

(57) ABSTRACT

Disclosed is a method for operating a rectifier circuit, a control circuit for operating a rectifier circuit, and a power converter. The method includes operating the rectifier circuit (2) in a PFC mode, wherein operating the rectifier circuit (2) in the PFC mode includes regulating an output voltage (Udc) of the rectifier circuit (2). Regulating the output voltage (Udc) includes operating a switch (26) of the rectifier circuit (2) at a fixed switching frequency (fsw), and regulating the output voltage (Udc) includes regulating the output voltage (Udc) dependent on at least one operating parameter of the rectifier circuit (2) such that the switch (26) is operated under ZVS conditions.

25 Claims, 19 Drawing Sheets

(51) Int. Cl.
    *H02M 7/217* (2006.01)
    *H02M 1/44* (2007.01)
    *H02M 3/335* (2006.01)
(52) U.S. Cl.
    CPC .............. *H02M 7/217* (2013.01); *H02M 1/44* (2013.01); *H02M 3/33573* (2021.05); *H02M 3/33576* (2013.01)
(58) Field of Classification Search
    CPC . H02M 3/33573; H02M 1/44; H02M 3/33576
    See application file for complete search history.

(56) References Cited

OTHER PUBLICATIONS

Yeong-Jun Choi et al, "A novel active discontinuous PWM control strategy for high efficiency partial switching predictive current-mode control PFC converter", 2017 IEEE 3rd International Future Energy Electronics Conference and ECCE Asia (IFEEC 2017—ECCE Asia), IEEE, Jun. 3, 2017 (Jun. 3, 2017), pp. 236-241, XP033129513.

* cited by examiner

OPERATING PARAMETER POWER CONVERSION METHOD AND POWER CONVERTER

RELATED APPLICATION

This application claims priority to earlier filed European Patent Application Serial Number EP22160572 entitled "POWER CONVERSION METHOD AND POWER CONVERTER,", filed on Mar. 7, 2022, the entire teachings of which are incorporated herein by this reference.

TECHNICAL FIELD

This disclosure relates in general to a power conversion method and a power converter circuit. In particular, the invention relates to an AC-DC power conversion method and power converter circuit including a PFC rectifier.

BACKGROUND

Power converters that employ AC-DC power conversion are widely used in various kinds of applications such as battery chargers or DC (direct current) power supplies. AC-DC power conversion includes converting power received from an AC (alternating current) power source into DC power. The AC power source is a power grid, for example. Dependent on the country, an AC voltage provided by the power grid may vary between 90 Vrms and 265 Vrms, for example. A voltage level of a DC voltage provided by the AC-DC converter is dependent on the specific application in which the power converter is used and may range from several volts to several 10 volts, for example.

AC-DC power converters may include a PFC (Power Factor Correction) rectifier that is configured to receive the ac power and generate a regulated DC link voltage based on the AC power. At the same time, the PFC rectifier is configured to regulate a waveform of an alternating current received from the AC power source in order to control a power factor.

The PFC rectifier may include electronic switches. Operating the electronic switches is associated with losses, wherein these losses include switching losses and conduction losses. Switching losses are losses associated with switching on and switching off the switches, and conduction losses (ohmic losses) are losses associated with currents flowing through the switches in an on-state.

The switching losses can be reduced by operating the electronic switches under ZVS (zero voltage switching) conditions. ZVS includes switching on a respective switch when a voltage across the switch is zero (has decreased to zero). However, conventional strategies for operating a PFC rectifier, such as operating the PFC rectifier in a triangular conduction (or current) mode (TCM), a critical conduction mode (CrCM), or a discontinuous conduction mode (DCM) are associated with a varying switching frequency, which may increase the complexity of EMI (electromagnetic interference) filters.

BRIEF DESCRIPTION

There is a need for a method for operating a PFC rectifier in an efficient way.

One example relates to a method. The method includes operating a rectifier circuit in a PFC mode. Operating the rectifier circuit in the PFC mode includes regulating an output voltage of the rectifier circuit. Regulating the output voltage includes operating a switch of the rectifier circuit at a fixed switching frequency, and regulating the output voltage includes regulating the output voltage dependent on at least one operating parameter of the rectifier circuit such that the switch is operated under ZVS conditions.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIGS. 17-18 illustrate different examples of the first converter stage; and

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION

Figure 1:
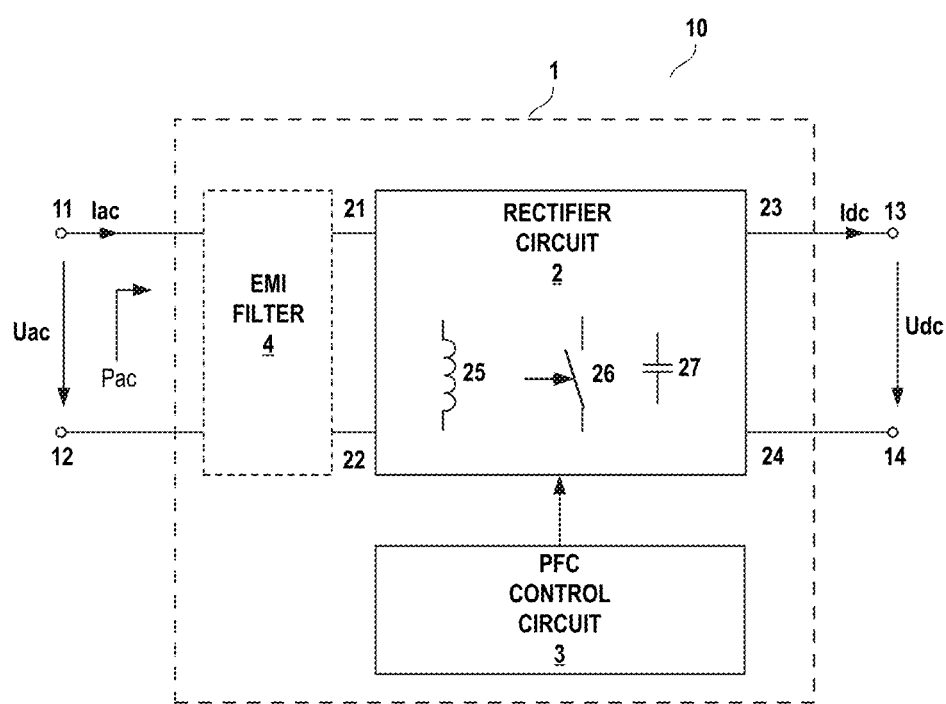
FIG. 1 schematically illustrates one example of a power converter circuit that includes a PFC rectifier.

FIG. 1 schematically illustrates one example of a power converter circuit 10. The power converter circuit 10 according to FIG. 1 includes a PFC (power factor correction) rectifier 1. The PFC rectifier 1 includes an input 11, 12 configured to receive an input voltage Uac and an input current Iac from a power source (not illustrated in FIG. 1) and an output 13, 14 configured to provide an output voltage Udc and an output current Idc to a load or load circuit (not illustrated in FIG. 1). The PFC rectifier 1 includes a rectifier circuit 2 and a PFC control circuit 3 that is configured to control operation of the rectifier circuit 2.

Optionally, an EMI (electromagnetic interference) filter 4 is connected between the input 11, 12 of the PFC rectifier and an input 21, 22 of the rectifier circuit 2. An output 23, 24 of the rectifier circuit 2 may form the output 13, 14 of the PFC rectifier 1.

Figure 2A:
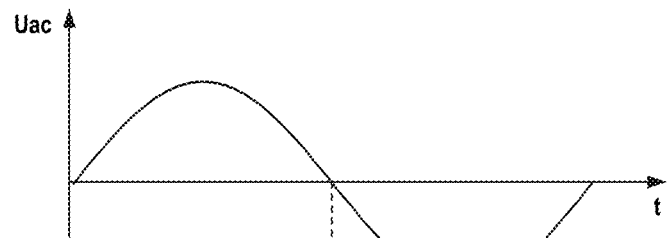
FIGS. 2A-2C illustrate signal diagrams of an input voltage, an (average) input current, and an input power of the power converter circuit.

The input voltage Uac is an alternating voltage such as, for example a sinusoidal voltage. The power source providing the alternating input voltage Uac is a power grid, for example. FIG. 2A shows a signal diagram of a sinusoidal input voltage Uac during one period of the sinusoidal input voltage Uac. An RMS (Rout Mean Square) value of the input voltage Uac and the amplitude Ûac of the input voltage Uac which is $\sqrt{2}$ times the RMS value $\text{Uac}_{rms}$, Ûac= $\sqrt{2} \cdot \text{Uac}_{rms}$, may vary within a certain range, for example, dependent on the country or the location where the power grid is established. Typical RMS values of alternating voltages received from power grids range between 90 Vrms and 265 Vrms. A typical frequency of the grid voltages is 50 Hz or 60 Hz.

The output voltage Udc is a direct voltage and the output current Idc is a direct current.

The PFC control circuit 3 is configured to control operation of the rectifier circuit 2 in a PFC mode. Operating the rectifier circuit 2 in the PFC mode includes operating the rectifier circuit 2 such that that an average input current $\text{Iac}_{avg}$ received by the rectifier circuit 2 has a current waveform that is in correspondence with the waveform of the input voltage Uac. Thus, for example, the average input current $\text{Iac}_{avg}$ is a sinusoidal input current when the input voltage Uac is a sinusoidal input voltage.

Figure 2B:
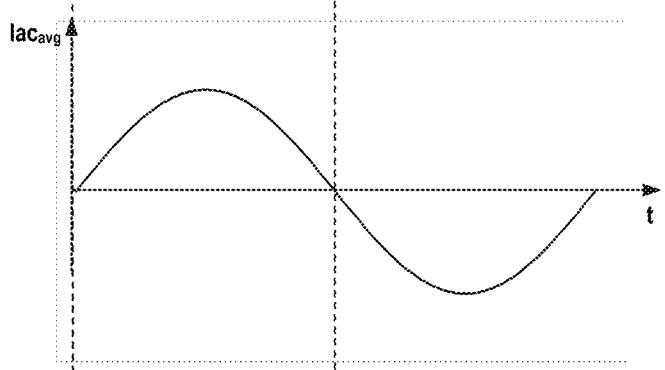

The rectifier circuit 2 may be operated in such a way that the average input current $\text{Iac}_{avg}$ is in phase with the input voltage Uac. In this case, the PFC rectifier 1, from the perspective of the power source, is an ohmic load. A signal diagram of a sinusoidal average input current $\text{Iac}_{avg}$ that is in phase with a sinusoidal input voltage Uac is illustrated in FIG. 2B. According to another example, the rectifier circuit is operated such that there is a certain phase shift between the average input current $\text{Iac}_{avg}$ and the input voltage Uac.

Figure 2C:
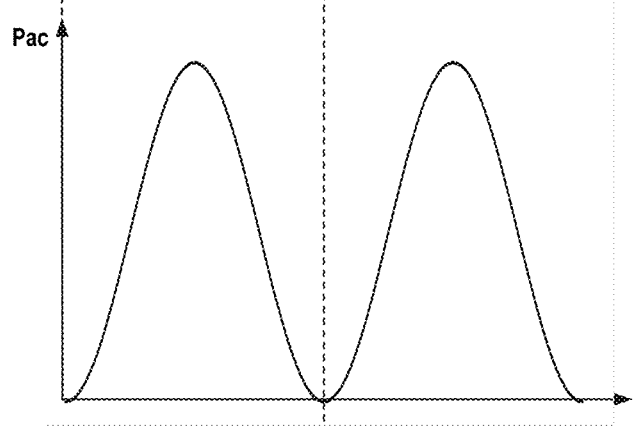

An input power received at the input 11, 12 is given by the input voltage Uac multiplied with the input current Iac, Pac=Uac·Iac. When the input voltage Uac is a sinusoidal voltage and the rectifier circuit 2 is operated in the PFC mode, the input power Pac has a sine-square waveform as illustrated in FIG. 2c, so that the input power regularly oscillates between a maximum power level and zero. The oscillating frequency is twice the frequency of the input voltage Uac.

An output power Pdc of the rectifier circuit is given by the output voltage Udc multiplied with the output current Idc, Pdc=Udc·Idc. The rectifier circuit 2 includes a capacitor 27 to buffer variations of the input power Pac that are associated with the PFC mode. It can be assumed that losses in the PFC rectifier are small as compared to an average input power $\text{Pac}_{avg}$, which is given by an average of the input power over one half-period of the input voltage Uac and the average input current $\text{Iac}_{avg}$. In this case, the output power Pdc approximately equals the average input power $\text{Pac}_{avg}$, $$Pdc \approx Pac_{avg} \quad (1).$$

Furthermore, when the input voltage Uac is a sinusoidal voltage and the average input current $\text{Iac}_{avg}$ is a sinusoidal current, the average input current $\text{Pac}_{avg}$ is 50% of a peak input power, $$Pac_{avg} = \frac{Pac_{pk}}{2} = \frac{\hat{U}ac \cdot \hat{I}ac_{avg}}{2}, \quad (2)$$

where $\text{Pac}_{pk}$ denotes the peak input power, and $\hat{I}ac_{avg}$ denotes an amplitude (a peak) of the average input current $\text{Iac}_{avg}$. When the average input current is in phase with the input voltage Uac, the peak $\hat{I}ac_{avg}$ of the average input current $\text{Iac}_{avg}$ occurs whenever the voltage level of the input voltage Uac equals ±Ûac.

The rectifier circuit has a boost converter topology, so that a voltage level of the output voltage Udc is equal to or higher than the amplitude Ûac of the input voltage, Udc≥Ûac. According to one example, the PFC rectifier 1 is configured to regulate the output voltage Udc in accordance with an output voltage reference Udc*. The output voltage reference Udc* defines a desired voltage level or setpoint of the output voltage Udc·According to one example, regulating the output voltage Udc in accordance with the output voltage reference Udc* includes regulating the output voltage such that a voltage level of the output voltage Udc at least approximately equals a voltage level defined by the output voltage reference Udc*.

Regulating the output voltage Udc by the PFC rectifier 1 includes regulating the average input power $\text{Pac}_{avg}$, wherein regulating the average input power $\text{Pac}_{avg}$ includes regulating the amplitude of the average input current $\text{Iac}_{avg}$. This is explained in detail herein further below.

For controlling the input current Iac, the rectifier circuit 2 includes an inductor 25 and an electronic switch 26. Controlling operation of the rectifier circuit 2 by the PFC control circuit 3 includes controlling operation of the switch 26, wherein controlling operation of the switch 26 includes operating the switch in an on-state (switched on state) or an off-state (switched off state). The inductor 25 and the switch 26 are coupled with each other and coupled to the input 21, 22 in such a way that the input current Iac increases and energy is stored in the inductor 25 when the switch 26 is in the on-state, and the input current Iac decreases and energy is transferred to the capacitor 26 and the output 23, 24 when the switch 26 is in the off-state. In this way, the input current Iac can be modulated in order to control waveform and amplitude of the average input current $\text{Iac}_{avg}$. Different examples of rectifier circuits 2 operating in this way are explained in detail herein further below.

Figure 3A:
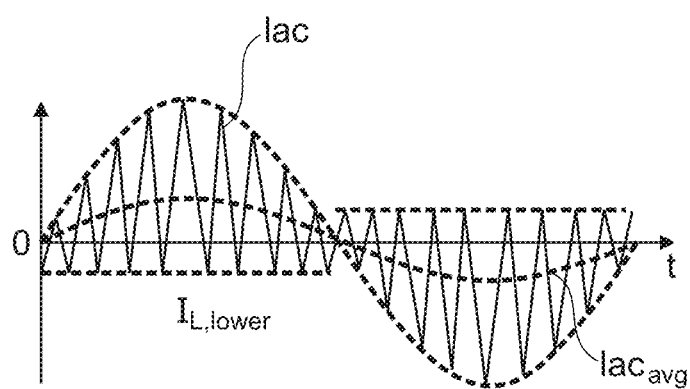
FIGS. 3A-3C show signal diagrams that illustrate conventional ways for operating a PFC rectifier.
Figure 3B:
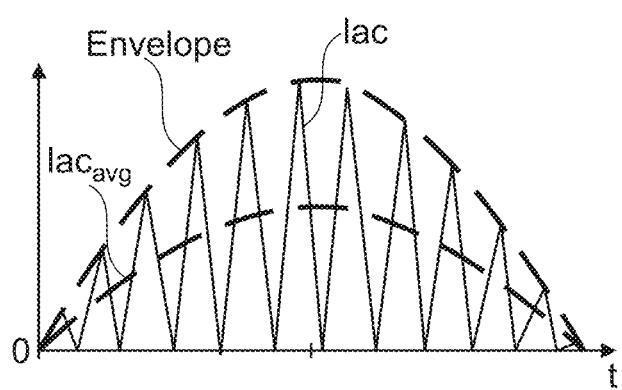
Figure 3C:
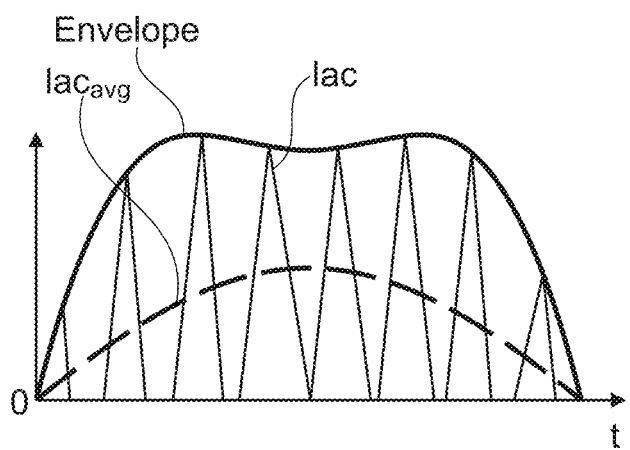

Conventional ways for operating a rectifier circuit 2 in a PFC mode are illustrated in FIGS. 3A to 3C, wherein each of these FIGS. 3A to 3C illustrates the input current Iac and the average input current $\text{Iac}_{avg}$ during one period or during one half-period of a sinusoidal average input current $\text{Iac}_{avg}$. FIG. 3A illustrates operating a PFC rectifier circuit in a triangular current mode (TCM). In this operating mode, the input current Iac is modulated such that it alternates in a triangular fashion between a first current level and a second current level. The first current level is negative during the positive half-wave of the average sinusoidal input current $\text{Iac}_{avg}$ and is positive during the negative half-wave. The second level defines a sinusoidal envelope.

FIG. 3B illustrates operating a PFC rectifier in a critical conduction mode (CrCM). In this operating mode, the input current Iac, in a triangular fashion, alternates between a first level and a second level, wherein the second level defines a sinusoidal envelope. The first level is zero in the critical conduction mode.

FIG. 3C illustrates operating a PFC rectifier in a discontinuous conduction mode (DCM). In this operating mode, the input current Iac may be zero for certain time periods.

Operating a PFC rectifier in TCM, CrCM, or DCM is commonly known, so that no further detailed description is required in this regard. In each of these operating modes, the modulation of the input current Iac can be achieved by operating at least one switch in the rectifier circuit 2 in a PWM fashion. In each of these operating modes, zero-voltage switching (ZVS) of the at least one switch is possible. ZVS includes that during an off-state (switched-off state) of the at least one electronic switch a voltage across the electronic switch decreases to zero, which may help to reduce switching losses.

The at least one switch may be operated such that the input current Iac increases when the switch is in an on-state and decreases when the switch is in an off-state. When operating the at least one switch such that the current during the off-state changes is polarity, as in TCM, or decreases to zero, as in CrCM and DCM, the at least one switch can be operated under ZVS conditions.

It should be noted that in FIGS. 3A to 3C the input current Iac is only schematically illustrated. The frequency of the triangular input current Iac is, usually, significantly higher than the frequency of the average input current $Iac_{avg}$ and the input voltage Uac. The frequency of the input voltage Uac and the alternating average input current $Iac_{avg}$ is 50 Hz or 60 Hz, for example. The frequency of the triangular input current Iac is several ten kilohertz or even several hundred kilohertz, for example.

In each of the three conventional operating modes illustrated in FIGS. 3A to 3C, the frequency of the triangular input current Iac significantly varies over one half-period of the input voltage Uac and the average input current $Iac_{avg}$. This frequency variation is dependent, inter alia, on the RMS value of the input voltage Uac.

Figure 4:
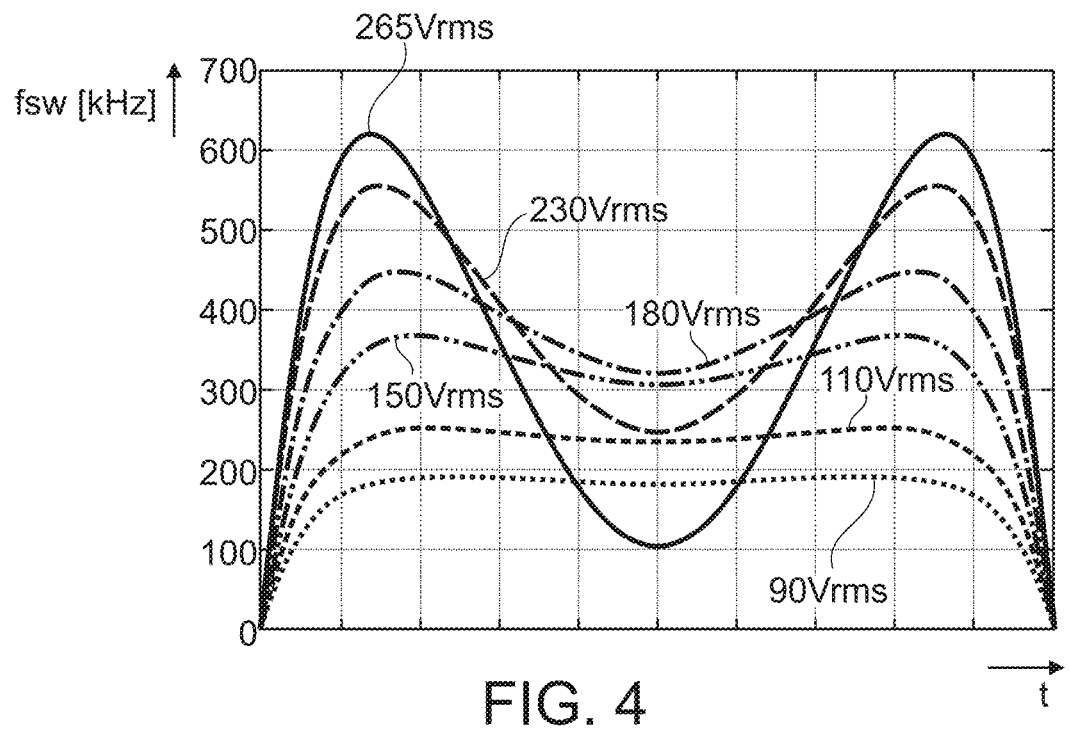
FIG. 4 illustrates switching frequency variations in a PFC rectifier operated in accordance with the method according to FIG. 3A.

FIG. 4 schematically illustrates the frequency variation of the triangular input current Iac in a PFC rectifier that is operated in TCM and generates a fixed output voltage Udc of 400V. FIG. 4 illustrates the frequency variation for six different input voltages Uac having RMS values of 90 Vrms, 110 Vrms, 150 Vrms, 180 Vrms, 230 Vrms, and 265 Vrms. As can be seen from FIG. 4, the higher the input voltage Uac, the stronger variations of the frequency of the triangular input current Iac. The frequency of the triangular input current Iac equals the frequency at which the at least one switch in the PFC rectifier is operated. This frequency is also referred to as switching frequency in the following.

Referring to the above, the PFC rectifier 1 may include an EMI filter 4. The EMI filter 4 is configured to attenuate electromagnetic interferences that result from a switched mode operation of the at least one switch in the rectifier circuit 2 in order to comply with governmental regulations. The larger the frequency range of the switched mode operation of the at least one switch, the more complicated is the EMI filter design and the larger is typically the EMI filter. The lowest occurring switching frequency determines the so-called cut-off frequency of the filter, wherein the lower the cut-off-frequency the larger the physical size of inductors included in the EMI filter. Moreover, for operating the PFC rectifier 1 in each of TCM, CrCM, and DCM a zero-crossing detector is required that detects when the input current Iac reaches or crosses zero. The zero-crossing detector requires additional circuitry and may complicate the design of the PFC rectifier 1.

There is therefore a need for operating a PFC rectifier in an efficient way, in particular, such that zero-voltage switching (ZVS) of the switch 26 included in the PFC rectifier 2 can be achieved, and such that a less complicated EMI filter can be used. This is achieved by operating the PFC rectifier 2 in accordance with the method illustrated in FIG. 5.

Figure 5:
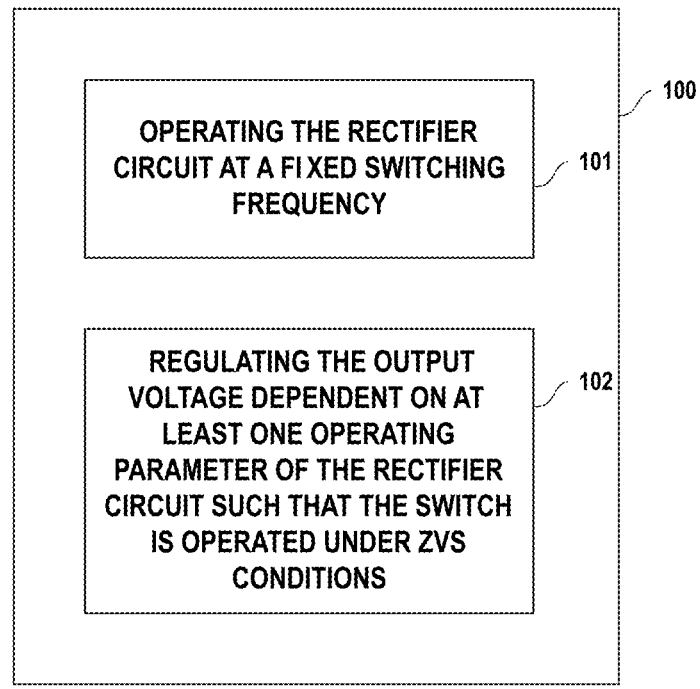
FIG. 5 illustrates one example of a method for operating a PFC rectifier.

The method 100 according to FIG. 5 includes operating the rectifier circuit 2 at a fixed switching frequency (101). Furthermore, the method includes regulating the output voltage comprises regulating the output voltage dependent on at least one operating parameter of the rectifier circuit such that the switch is operated under ZVS conditions (102).

According to one example, operating the rectifier circuit 2 at a fixed switching frequency includes operating the switch 26 included in the rectifier circuit 2 at a fixed switching frequency. Operating the switch 26 at the fixed switching frequency includes switching on the switch 26 at the fixed switching frequency or switching off the switch 26 at the fixed switching frequency, wherein on-durations or off-durations may vary in order to control the input current Iac. "On-durations" are time durations during which the switch 26 is in the one-state and "off-durations" are time durations in which the switch 26 is in the off-state.

According to one example, regulating the output voltage dependent on at least one operating parameter of the rectifier circuit such that the switch is operated under ZVS conditions includes adjusting the output voltage reference Udc* dependent on the at least one operating parameter of the rectifier circuit, and regulating the output voltage of the rectifier circuit such that a voltage level of the output voltage is in accordance with the output voltage reference.

Referring to the above, the output voltage reference Udc* defines a desired voltage level or setpoint of the output voltage Udc. According to one example, the at least one operating parameter based on which the output voltage reference Udc* is varied is the RMS value of the input voltage Uac received by the rectifier stage 2. One example for varying the output voltage reference Udc* dependent on the RMS value $Uac_{rms}$ of the input voltage Uac is explained in the following.

Figure 6:
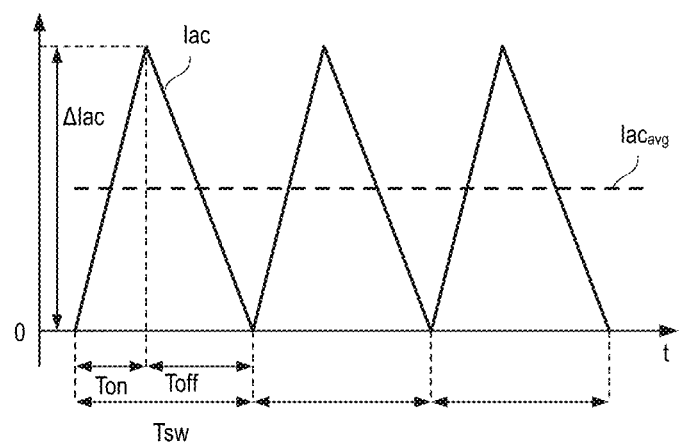
FIG. 6 schematically illustrates an input current of the PFC rectifier.

FIG. 6 schematically illustrates the input current Iac during several periods of the input current Iac, wherein each of these periods has a duration Tsw, wherein the duration Tsw is the reciprocal of the fixed switching frequency fsw, $$Tsw = \frac{1}{fsw}. \tag{3}$$

The input current Iac has a triangular waveform. In each period, the input current Iac increases during a first time period Ton and decreases during a second time period Toff. The first time period Ton, which may also be referred to as on-time, equals the duration of an on-time (switched on time) of the at least one electronic switch included in the rectifier circuit 2. The second time period Toff, which may also be referred to as off-time, equals a duration of an off-time (switched off time) of the electronic switch 26 included in the rectifier circuit 2. This is explained in detail herein further below.

FIG. 6 illustrates an operating scenario in which an instantaneous voltage level of the input voltage Uac is positive. In this case, the input current Iac increases during the on-time Ton and decreases during the off-time Toff. When the input voltage Uac is negative, the input current Iac decreases during the on-time, so that the magnitude increases, and increases during the off-time, so that the magnitude decreases.

The equations provided in the following relate to the positive half-period of the input voltage Uac. The dependency of the output voltage reference Udc* on different operating parameters that can be obtained from this equations, however, is independent of the polarity of the input voltage Uac.

Referring to the above, ZVS can be achieved when the input current Iac crosses zero in each period, in particular, when the current crosses zero before the switch switches on. FIG. 6 illustrates the input current Iac reaching zero in each period. In FIG. 6, ΔIac denotes a peak-to-peak current ripple ΔIac. The input current Iac reaches zero in each period when $$\Delta Iac(t) = 2 \cdot Iac_{avg}(t) \qquad (4a),$$

where Iac_avg(t) denotes the average input current which, referring to FIG. 2, may vary over the time, and ΔIac(t) denotes the peak-to-peak current ripple. The input current Iac crosses zero in each period, and ZVS can be achieved, whenever $$\Delta Iac(t) > 2 \cdot Iac_{avg}(t) \qquad (4b).$$

In the rectifier circuit 2, the inductor 25 is connected to the input 21, 21 such that during the on-time Ton of the electronic switch 26 the input voltage Uac is applied to inductor 25, so that a slope of the input current Iac is given by $$\frac{dIac(t)}{dt} = \frac{Uac(t)}{L}, \qquad (5)$$

where dIac(t)/dt denotes the slope of the input current Iac and L denotes an inductance of the inductor 25. Referring to FIG. 6, the input current Iac increases during the on-time Ton of the electronic switch 26, so that the peak-to-peak current ripple ΔIac can be expressed as $$\Delta Iac(t) = \frac{dIac(t)}{dt} \cdot Ton = \frac{Uac(t)}{L} \cdot Ton. \qquad (6a)$$

In the rectifier circuit 2, the on-time of the electronic switch 26 is dependent on a modulation index m(t), which is given by the ratio between the instantaneous voltage level of the input voltage Uac and the voltage level of the output voltage Udc, $$m(t) = \frac{Uac(t)}{Udc}, \qquad (7)$$

where Uac(t) denotes the (varying) voltage level of the input voltage Uac, and Udc denotes the voltage level of the output voltage Udc. Referring to the above, the rectifying circuit 2 of the PFC rectifier 1 operates as a boost converter, so that the voltage level of the output voltage Udc is equal to or higher than the amplitude Ûac of the input voltage. Thus m(t)≥1. In this case, the on-time Ton is dependent on the modulation index m(t) as follows, $$Ton = (1 - m(t)) \cdot Tsw = \frac{1 - m(t)}{fsw}. \qquad (8)$$

Based on equation (8) it can be seen that the lower the input voltage level Uac(t) relative to the output voltage level Udc, the longer the duration of the on-time. Based on equations (6a), (7) and (8), the peak-to-peak current ripple ΔIac can be expressed as $$\Delta Iac(t) = \frac{Uac(t)}{L} \cdot \frac{1 - m(t)}{fsw} = \frac{Uac(t)}{L} \cdot \frac{1 - \frac{Uac(t)}{Udc}}{fsw} = \frac{Uac(t) - \frac{Uac(t)^2}{Udc}}{L \cdot fsw}. \qquad (6b)$$

It can be shown that in view of operating the switch 26 under ZVS conditions the operating scenario in which the magnitude of the average input current $Iac_{avg}$ reaches the peak value $\hat{I}ac_{avg}$ is most critical. Considering equation (2), the peak value $\hat{I}ac_{avg}$ of the average input current $Iac_{avg}$ is given by $$\hat{I}ac_{avg} = \frac{2 \cdot Pac_{avg}}{\hat{U}ac}. \qquad (9a)$$

When the input voltage Uac is a sinusoidal voltage, $$\hat{U}ac = \sqrt{2} \cdot Uac_{rms} \qquad (10),$$

so that $$\hat{I}ac_{avg} = \frac{\sqrt{2} \cdot Pac_{avg}}{Uac_{rms}}. \qquad (9b)$$

Let $t_{wc}$ be the time instance at which the average input current $Iac_{avg}$ reaches the peak value, so that $Iac_{avg}(t_{wc}) = \hat{I}ac_{avg}$. Considering equation (4b), ZVS at time instance $t_{wc}$ can be achieved whenever $$\Delta Iac(t_{wc}) > 2 \cdot Iac_{avg}(t_{wc}) => \Delta Iac(t_{wc}) \geq 2 \cdot \hat{I}ac_{avg} \qquad (11).$$

For the purpose of explanation it is assumed that the input voltage Uac and the average input current $Iac_{avg}$ are in phase. In this case, the input voltage Uac reaches its peak Ûac at time instance $t_{wc}$, that is, Uac(t)=Ûac.

Considering equations (6b) and (10), the peak-to-peak current ripple ΔIac at time instance $t_{wc}$ is given by $$\Delta Iac(t_{wc}) = \frac{\sqrt{2} \cdot Uac_{rms}(t) - \frac{\left(\sqrt{2} \cdot Uac_{rms}(t)\right)^2}{Udc}}{L \cdot fsw}. \qquad (12)$$

Considering equations (11), (9b), and (12), ZVS at time instance $t_{wc}$ can be achieved whenever $$\frac{\sqrt{2} \cdot Uac_{rms}(t) - \frac{\left(\sqrt{2} \cdot Uac_{rms}(t)\right)^2}{Udc}}{L \cdot fsw} > 2 \cdot \frac{\sqrt{2} \cdot Pac_{avg}}{Uac_{rms}}. \qquad (13)$$

Solving equation (13) for Udc yields $$Udc > \frac{Uac_{rms}^3 \cdot \sqrt{2}}{Uac_{rms}^2 - Pac_{avg} \cdot 2 \cdot fsw \cdot L}. \quad (14)$$

The switch 26 in the rectifier circuit 2 can be operated under ZVS conditions throughout the period of the input voltage Uac when the switching frequency fsw is fixed and the output voltage Udc is in accordance with equation (14). Thus, according to one example, the output voltage reference Udc*, in accordance with equation (14), is selected (adjusted) as follows, $$Udc^* > \frac{Uac_{rms}^3 \cdot \sqrt{2}}{Uac_{rms}^2 - Pac_{avg} \cdot 2 \cdot fsw \cdot L}. \quad (15)$$

The inductance L and the switching frequency fsw are fixed. According to one example, the inductance L and the switching frequency fsw are selected to meet the following condition, $$fsw \cdot L < \frac{Uac\_min_{rms}^2}{2 \cdot Pmax_{avg}}, \quad (16)$$

so that the denominator in equations (15) and (16) is greater than zero, where $Uac\_min_{rms}$ denotes the RMS value of the lowest possible input voltage Uac, and $Pmax_{avg}$ denotes the maximum average input power of the rectifier circuit 2. In the following, $Udc_{crit}^*$ denotes the critical output voltage reference, wherein $$Udc_{crit}^* = \frac{Uac_{rms}^3 \cdot \sqrt{2}}{Uac_{rms}^2 - Pac_{avg} \cdot 2 \cdot fsw \cdot L}. \quad (17)$$

The critical output voltage reference $Udc_{crit}^*$ is the smallest possible output voltage for which the current Iac reaches zero in each period.

Figure 7:
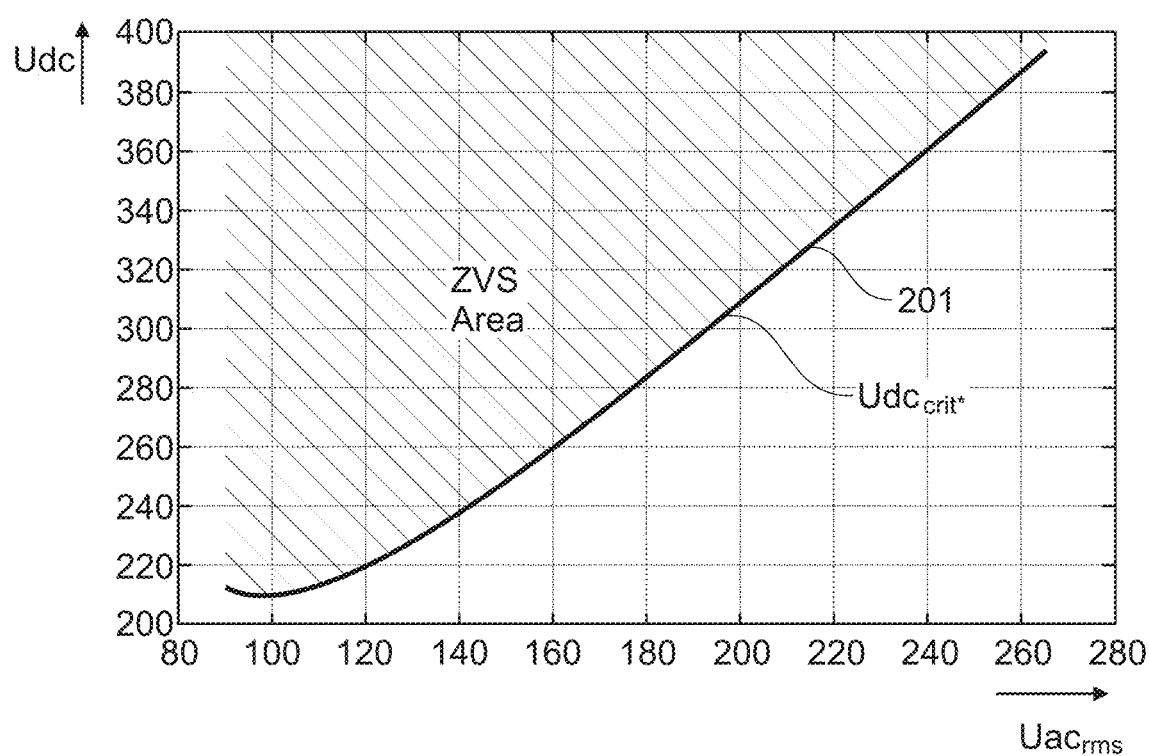
FIG. 7 illustrates a critical output voltage (a critical output voltage reference) dependent on an RMS value of an input voltage.

FIG. 7 illustrates the critical output voltage reference $Udc_{crit}^*$ dependent on the RMS value of the input voltage Uac at a given power $Pac_{avg}$, a given switching frequency fsw, and a given inductance L of the inductor 25 included in the PFC rectifier. The diagram shown in FIG. 7 is based on an example in which the output power $Pac_{avg}$ is 240 W, the switching frequency fsw is 135 kHz, and the inductance is 50 microhenries (μH).

In FIG. 7, curve 201 represents the critical output voltage reference $Udc_{crit}^*$. Operating the switch 26 under ZVS can be achieved when the output voltage Udc or the output voltage reference Udc* is above curve 201. As can be seen from FIG. 7, the higher the RMS value $Uac_{rms}$ of the input voltage Uac, the higher the critical output voltage reference $Udc_{crit}^*$.

Figure 8A:
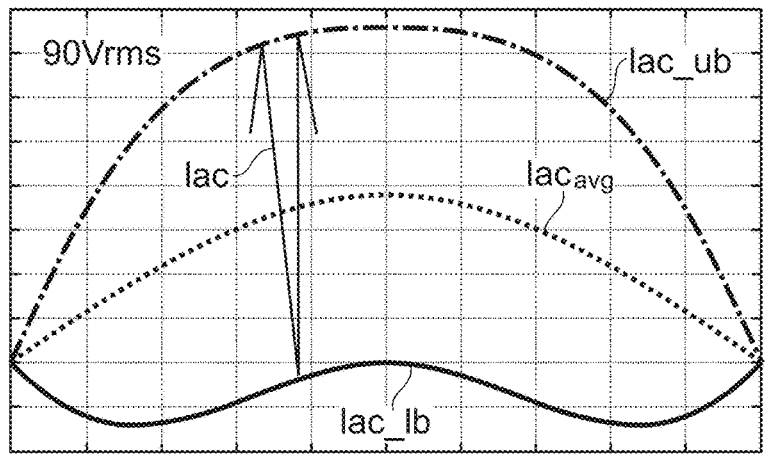
FIG. 8A-8E illustrates upper and lower current ripples boundaries and an average input current at different input voltages and an output current reference selected in accordance with FIG. 7.
Figure 8B:
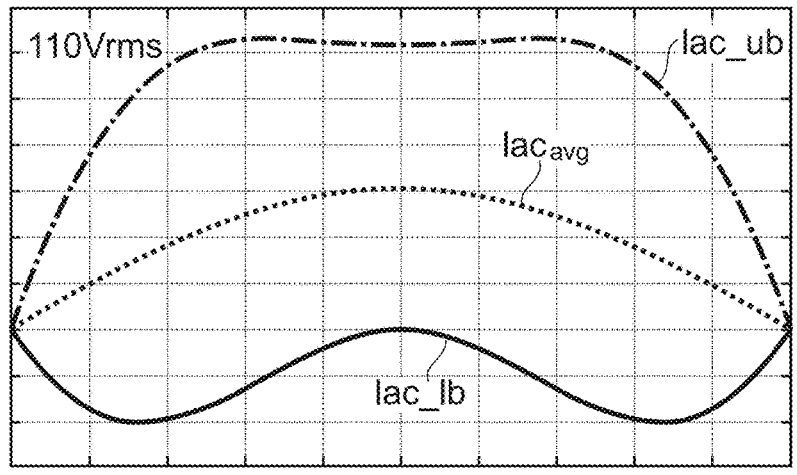
Figure 8C:
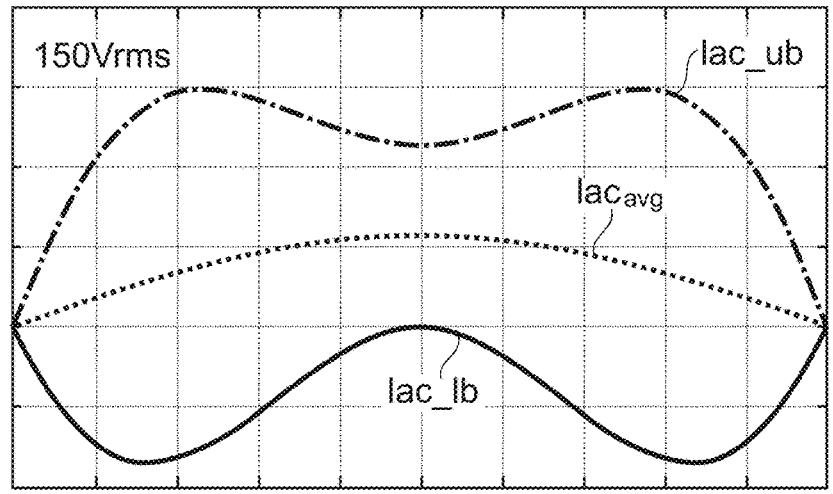
Figure 8D:
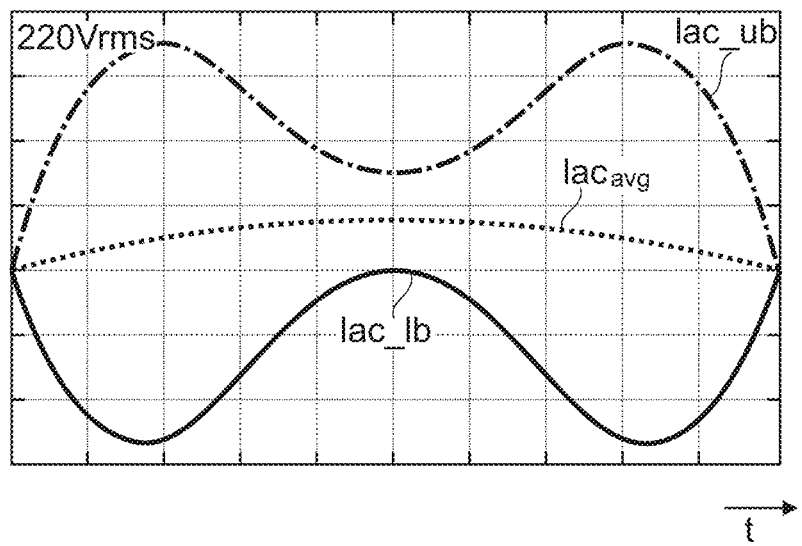
Figure 8E:
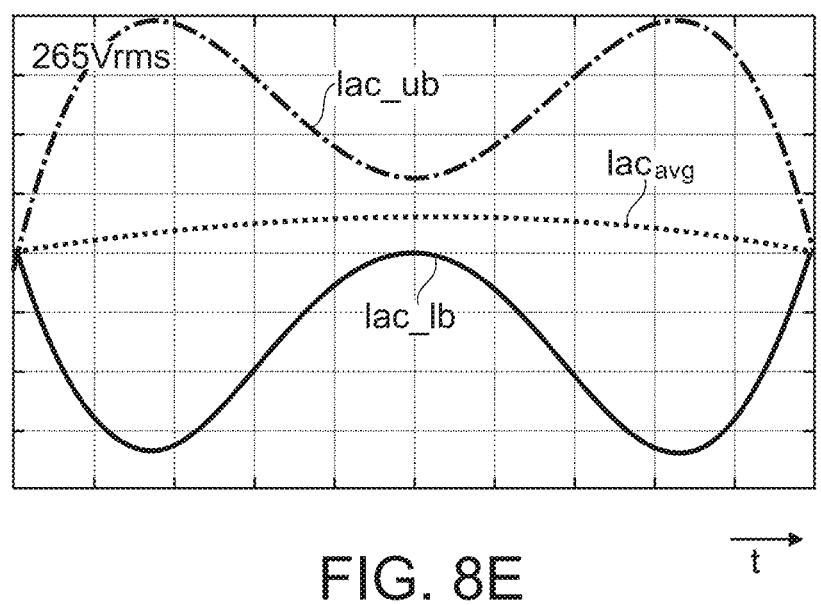

FIGS. 8A-8E illustrate the average input current $Iac_{avg}$ during one half-period of the average input current $Iac_{avg}$ obtained for input voltages with different RMS values, 90 Vrms in FIG. 8A, 110 Vrms in FIG. 8B, 150 Vrms in FIG. 8C, 220 Vrms in FIG. 8D, and 265 Vrms in FIG. 8E. In the examples illustrated in FIGS. 8A-8E, the power $Pac_{avg}$, the switching frequency fsw, and the inductance L of the inductor 25 included in the PFC rectifier 2 are the same as in the example illustrated in FIG. 7.

In addition to the average input current $Iac_{avg}$, FIGS. 8A to 8E illustrate upper current ripple boundaries Iac_ub and lower current ripple boundaries Iac_lb. The input current Iac, which is only schematically illustrated in one section of FIG. 8A, oscillates between these upper and lower ripple boundaries Iac_ub, Iac_lb. In each of the examples illustrated in FIGS. 8A to 8E, the output voltage Udc equals the critical output voltage reference $Udc_{crit}^*$ that can be obtained based on FIG. 7 for each of the respective RMS values $Uac_{rms}$ of the input voltage Uac. In this example, the lower current ripple boundary Iac_lb reaches zero when the average current $Iac_{avg}$ reaches its maximum $\hat{I}ac_{avg}$, that is, when the input voltage Uac reaches its maximum $\hat{U}ac$ during the respective half-period. During the remainder of the half-period illustrated in FIGS. 8A to 8E, the lower current ripple boundary Iac_lb is negative, so that the current Iac crosses zero in each period of the current Iac.

It should be noted that FIGS. 8A to 8E illustrate the average input current $Iac_{avg}$ during the positive half-period of the average input current $Iac_{avg}$. The situation in the negative half-period can be obtained by mirroring the diagrams shown in FIGS. 8A to 8E on the axis representing an input current of zero. During the negative half-periods, the lower current ripple boundaries illustrated in FIGS. 8A to 8E become upper current ripple boundaries and the upper current ripple boundaries illustrated in FIGS. 8A to 8E become lower current ripple boundaries.

As can be seen from FIGS. 8A-8E, at a given average input power $Pac_{avg}$, the lower the RMS value $Uac_{rms}$ of the input voltage Uac, the higher the amplitude of the average input current $Iac_{avg}$.

Referring to FIG. 5, the output voltage reference Udc* is adjusted dependent on at least one operating parameter of the rectifier circuit 2. Referring to equation (15), operating parameters that affect the output voltage reference Udc*, at a given switching frequency fsw and a given inductance L, are the RMS value $Uac_{rms}$ of the input voltage Uac and the average input power $Pac_{avg}$. According to one example, the output voltage reference Udc* is adjusted as a function of the input voltage RMS value $Uac_{rms}$ as follows, $$Udc^*(Uac_{rms}) = \frac{Uac_{rms}^3 \cdot \sqrt{2}}{Uac_{rms}^2 - Pmax \cdot 2 \cdot fsw \cdot L},$$

where Pmax denotes one of the maximum average input power and the maximum output power of the rectifier circuit 2. In this example, the output voltage reference Udc* equals the critical output voltage reference $Udc_{crit}^*$ when the average input power or the output power equals the maximum power Pmax. The latter may include that the input current Iac reaches zero when the input voltage Uac reaches its maximum, but may not cross zero.

According to one example, the output voltage reference Udc* is adjusted as a function of the input voltage RMS value $Uac_{rms}$ as follows, $$Udc^*(Uac_{rms}) = p \cdot \frac{Uac_{rms}^3 \cdot \sqrt{2}}{Uac_{rms}^2 - Pmax \cdot 2 \cdot fsw \cdot L}, \quad (18b)$$

where p denotes a proportionality factor selected from between 1 and 1.2, 1<p<1.2. In this example, the output voltage reference Udc* is always higher than the critical output voltage reference $Udc_{crit}^*$, so that the input current Iac crosses zero in each period.

According to another example, the output voltage reference Udc* is adjusted as a function of both the input voltage RMS value $Uac_{rms}$ and one of the average input power $Pac_{avg}$ and the output power Pdc as follows, $$Udc^*(Uac_{rms}, P) = q \cdot \frac{Uac_{rms}^3 \cdot \sqrt{2}}{Uac_{rms}^2 - P \cdot 2 \cdot fsw \cdot L}, \quad (19)$$

where P denotes one of the average instantaneous input power $Pac_{avg}$ and the instantaneous output power Pdc, and q is a proportionality selected from between 1 and 1.2, 1<q<1.2.

When selecting the output voltage reference Udc* in accordance with any one of equations (18A), (18B), or (19), for example, and when operating the switch 26 at the fixed switching frequency and a varying duty cycle, the input current Iac "automatically" is generated in such a way that it crosses zero twice in each drive cycle, so that ZVS is ensured.

The rectifier circuit 2 may be implemented in various ways. Some examples for implementing the rectifier circuit 2 are explained in the following.

Figure 9:
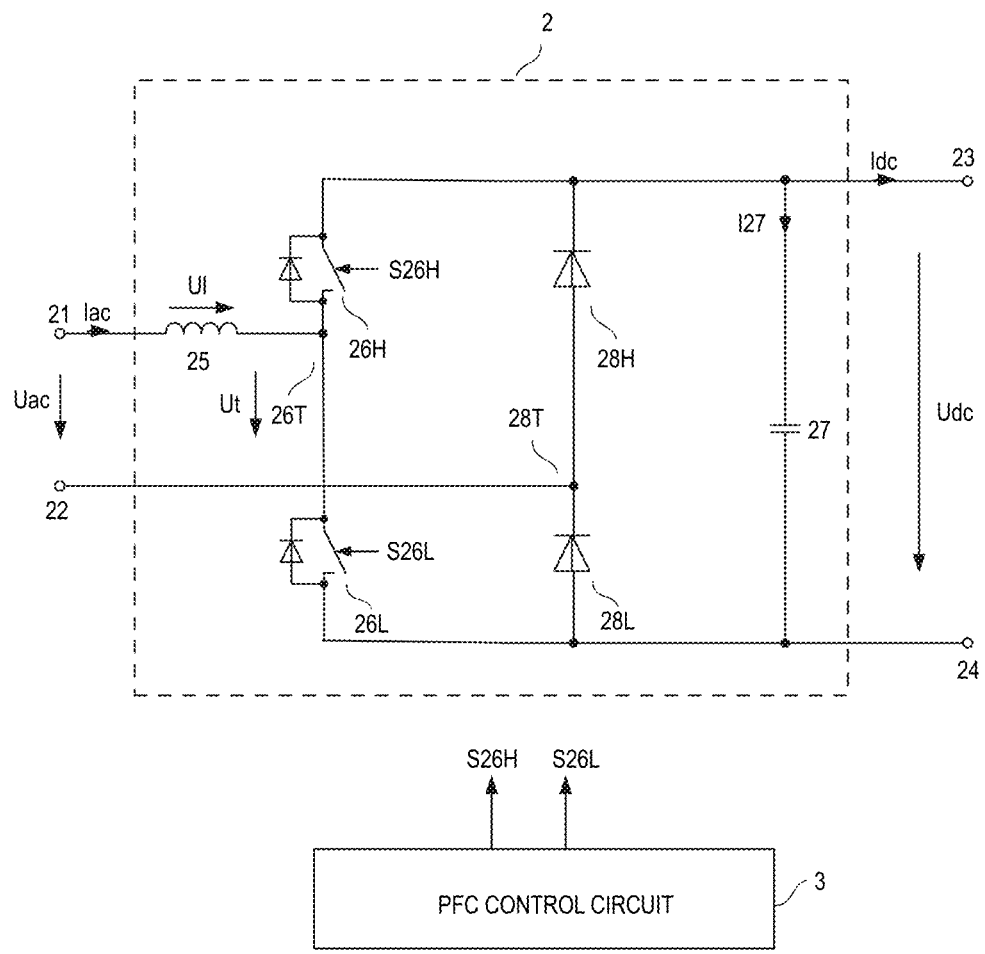
FIGS. 9-11 illustrate different examples of a rectifier circuit of the PFC rectifier.

FIG. 9 illustrates one example of the rectifier circuit 2 in greater detail. In the example shown in FIG. 9, the rectifier circuit 2 includes a Totem pole dual boost PFC rectifier topology or, in short, Totem pole topology. The inductor 25 of the rectifier circuit 2 is connected between the input 21, 22 of the rectifier circuit 2 and a tap 26T of a first half-bridge, which may also be referred to as switch half-bridge. More specifically, the inductor 25 is connected between one of the input nodes 21, 22 and the tap 26T. In the example shown in FIG. 9, the inductor 25 is connected between the first input node 21 and the tap 26T. This, however, is only an example. According to another example (not illustrated), the inductor 25 is connected between the second input node 22 and a tap 28T of a rectifier half-bridge explained in the following.

Referring to FIG. 9, the output capacitor 27 is connected between the output nodes 23, 24.

The switch half-bridge 26 includes a first switch 26H, which is also referred to as high-side switch in the following, and a second switch 26L, which is also referred to as low-side switch in the following. The high-side switch 26H and the low-side switch 26L are connected in series between the output nodes 23, 24 of the rectifier circuit 2 and are connected with one another at the tap 26T.

According to one example, each of the high-side switch 26H and the low-side switch 26L includes a rectifier element that is configured to conduct when a voltage across the respective switch 26H, 26L has a certain polarity. The rectifier element is represented by a diode in the example shown in FIG. 9. The high-side switch 26H and the low-side switch 26L may be implemented as a MOSFET, so that the rectifier element may be formed by the body diode of the respective MOSFET. This, however, is only an example. Any other type of electronic switch with an internal rectifier element or any other type of electronic switch having an external rectifier element connected in parallel thereto may be used as well. Further examples of high-side and low-side switches 26H, 26L include HEMTs (High Electron Mobility Transistors, IGBTs (Insulated Gate Bipolar Transistors), or cascode circuits with a normally-on transistor and a normally-off transistors.

Referring to FIG. 9, the high-side switch 26H and the low-side switch 26L may be connected between the tap 26T and the first and second output nodes 23, 24 such that the rectifier element of the high-side switch 26H conducts when an electrical potential at the tap 26T is higher than the electrical potential at the first output node 23 and such that the rectifier element of the low-side switch 26L conducts when the electrical potential at the tap 26T is lower than the electrical potential at the second output node 24.

Referring to FIG. 9, the rectifier circuit 2 further includes a second half-bridge 28 that is connected between the first and second output nodes 23, 24 and includes a tap 28T that is connected to the input. In the example illustrated in FIG. 9, the tap 28T is connected to the second input node 22.

The second half-bridge 28, which may also be referred to as rectifier half-bridge, includes two rectifier elements connected in series between the first and second output nodes 23, 24 and connected with each other at the tap 28T. A first rectifier element 28H is connected between the tap 28T and the first output node 23 and is also referred to as high-side rectifier element in the following, and a second rectifier element 28L is connected between the second output node 24 and the tap 28T and is also referred to as low-side rectifier element in the following. Just for the purpose of illustration, the rectifier elements 28H, 28L are pn diodes in the example shown in FIG. 9. However, these rectifier elements may be implemented as Schottky diodes as well.

According to another example, in order to reduce conduction losses, an electronic switch (not shown in FIG. 9) is connected in parallel with each of the high-side element 28H and the low-side rectifier element 28L and is switched on by a respective drive circuit whenever the respective rectifier element is forward biased. Implementing a converter stage with a totem pole topology in this way is commonly known, so that no further explanation is required in this regard.

According to one example, the high-side rectifier element 28H is connected between the tap 28T of the second half-bridge 28 and the first output node 23 in such a way that the high-side rectifier element 28H conducts when the electrical potential at the tap 28T is higher than the electrical potential at the first output node 23, and the low-side rectifier element 28L is connected between the second output node 24 and the tap 28T such that the low-side rectifier element 28L conducts when the electrical potential at the second output node 24 is higher than the electrical potential at the tap 28T.

Referring to FIG. 9, the PFC control circuit 3 is configured to control operation of the rectifier circuit 2 by providing drive signals S26H, S26L received by the high-side switch 26H and the low-side switch 26L. Examples of the PFC control circuit 3 are explained in detail herein further below.

Referring to the above, the amplitude and the waveform of the average input current $Iac_{avg}$ can be adjusted by suitably controlling on-times and off-times of an electronic switch included in the rectifier circuit. The rectifier circuit 2 according to FIG. 9 includes two switches, high-side switch 26H and low-side switch 26L. Dependent on the polarity of the input voltage Uac one of the high-side switch 26H and low-side switch 26L acts as a control switch for controlling the input current Iac and the other one of the high-side switch 26H and low-side switch 26L acts as a rectifier element.

During a positive half-wave (half-period) of the input voltage Uac, the low-side switch 26L acts as the control switch for controlling the input current Iac and the high-side switch 26H acts as a rectifier element. The high-side switch 26H may be switched off throughout the positive half-period of the input voltage Uac or may be switched on and off complementarily to the low-side switch 26L. During the positive half-period of the input voltage Uac, the input current Iac increases whenever the low-side switch 26L is switched on and the input current Iac flows via the inductor 25, the low-side switch 26L and the low-side rectifier element 28L. When the low-side switch 26L switches off, the input current through the inductor 25 decreases and continues to flow via the high-side switch 26H or the parallel rectifier element, the output capacitor 27 and the load circuit (not shown), and the low-side rectifier element 28L.

During a negative half-wave (half-period) of the input voltage Uac, the high-side switch 26H acts as the control switch for controlling the input current Iac and the low-side switch 26L acts as a rectifier element. The low-side switch 26H may be switched off throughout the negative half-period of the input voltage Uac or may be switched on and off complementarily to the low-side switch 26L. During the negative half-period of the input voltage Uac, the average input current is negative. The input current Iac decreases (towards more negative current levels) whenever the high-side switch 26H is switched on and the input current Iac flows via the high-side rectifier element 28H, the high-side switch 26H and the inductor 25. When the high-side switch 26H switches off, the input current through the inductor 25 increases (towards more positive current levels) and continues to flow via the low-side switch 26H or the parallel rectifier element, the output capacitor 27 and the load circuit (not shown), and the high-side rectifier element 28L.

In each case, for controlling the input current Iac, the PFC control circuit 3 controls the duty cycle d26 of the switch acting as the control switch at the respective time instance. The duty cycle d26 is given by $$d26 = \frac{Ton}{Tsw}, \quad (20)$$

where Tsw=1/fsw denotes the time duration of one drive cycle of the control switch and equals the duration of one period of the input current Iac, and Ton denotes the duration of the on-time of the control switch.

Each of the high-side switch 26H and the low side switch 26L includes an output capacitance, which is a capacitance parallel to the respective switch. The output capacitance is charged whenever the respective switch 26H, 26L switches off and a voltage across the switch 26H, 26L increases. When the current through the inductor 25 is allowed to change its polarity during the off-time of the respective switch 26H, 26L the output capacitance is discharged, so that the voltage across the switch 26H, 26L decreases and the switch 26H, 26L can be switched on under ZVS conditions.

Implementing the rectifier circuit 2 with a totem pole topology is only an example. Any other kind of converter stage having a boost converter topology may be used as well. Further examples of converter stages 2 having a boost converter topology are illustrated in FIGS. 9A-9C and explained in the following.

Figure 10:
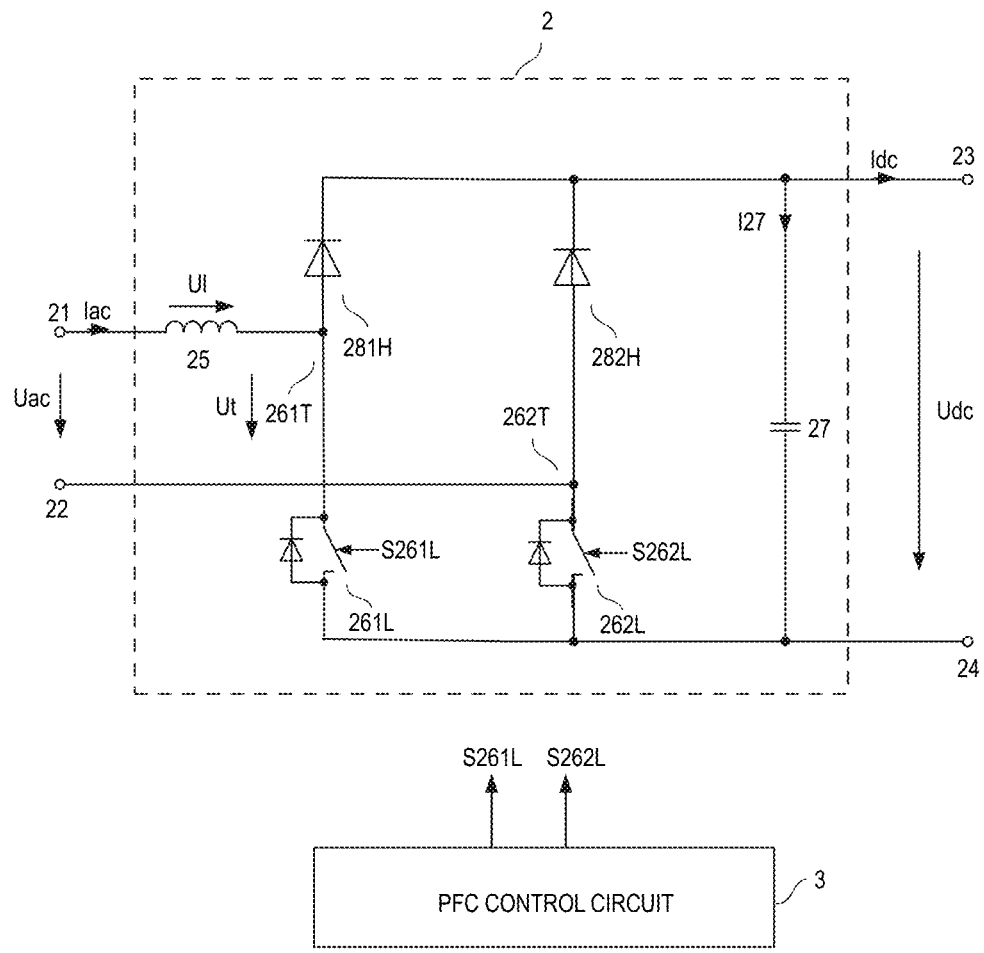

FIG. 10 shows a rectifier circuit 2 which is a modification of the converter stage according to FIG. 9. The topology of the rectifier circuit 2 according to FIG. 10A may be referred to as double boost PFC rectifier or, in short, double boost topology.

The rectifier circuit 2 according to FIG. 10 is different from the rectifier circuit 2 according to FIG. 9 in that a first half-bridge, which has a first tap 261T connected to the inductor 25, includes a first low-side switch 261L and a first high-side rectifier element 281H (instead of a high-side switch and a low-side switch) and in that a second half-bridge, which has a second tap 262T connected to the second input node 22, includes a second low-side switch 262L and a second high-side rectifier element 282H (instead of a high-side rectifier element and a low-side rectifier element).

The first high-side rectifier 281H is connected between the tap 261T and the first output node 23 such that it conducts when the electrical potential at the first tap 261T is higher than the electrical potential at the first output node 23. Furthermore, the second high-side rectifier element 282H is connected between the second tap 262T and the first output node 24 such that it conducts when the electrical potential at the tap 262T is higher than the electrical potential at the first output node 23.

Referring to FIG. 10, the first and second low-side switches 261L, 262L may each include a rectifier element (freewheeling element) that is configured to conduct when a voltage across the respective switch 261L, 262L has a certain polarity. Referring to FIG. 10, the first low-side switch 261L may be connected between the first tap 261T and the second output node 24 such that the rectifier element of the first low-side switch 261L conducts when an electrical potential at the first tap 261T is lower than the electrical potential at the second output node 24, and the second low-side switch 262L of the second half-bridge may be connected between the second tap 262T and the second output node 24 such that the rectifier element of the second low-side switch 262L conducts when an electrical potential at the second tap 262T is lower than the electrical potential at the second output node 24.

In the rectifier circuit 2 according to FIG. 10, dependent on the polarity of the input voltage Uac one of the first and second low-side switches 261L, 262L acts as a control switch for controlling the input current Iac and the other one of the first and second low-side switches 261L, 262L acts as a rectifier element.

During a positive half-wave (half-period) of the input voltage Uac, the first low-side switch 261L acts as the control switch for controlling the input current Iac and the second low-side switch 262L acts as a rectifier element. The second low-side switch 262L may be switched off throughout the positive half-period of the input voltage Uac or may be switched on throughout the positive half-period of the input voltage Uac.

During a positive half-period of the input voltage Uac, the input current Iac increases whenever the first low-side switch 261L is switched on and the input current Iac flows via the inductor 25, the first low-side switch 261L and the second low-side switch 262L or its rectifier element. When the first low-side switch 261L switches off, the input current through the inductor 25 decreases and continues to flow via the first high-side rectifier element 281H, the output capacitor 27 and the load circuit (not shown), and the second low-side switch 262L or its rectifier element.

During a negative half-wave (half-period) of the input voltage Uac, the second low-side switch 262L acts as the control switch for controlling the input current Iac and the first low-side switch 261L acts as a rectifier element. The first low-side switch 261L may be switched off throughout the negative half-period of the input voltage Uac or may be switched on and throughout the negative half-period of the input voltage Uac.

During the negative half-period of the input voltage Uac, the average input current is negative. The input current Iac decreases (towards more negative current levels) whenever the second low-side switch 26H is switched on and the input current Iac flows via the second low-side switch 262L, the first low-side switch 261L or its rectifier element and the inductor 25. When the second low-side switch 262L switches off, the input current through the inductor 25 increases (towards more positive current levels) and continues to flow via the second high-side rectifier element 282H, the output capacitor 27 and the load circuit (not shown), and the high-side rectifier element 28L, and the first low-side switch 261L or its rectifier element.

Referring to FIG. 10, the PFC control circuit 3 is configured to control operation of the rectifier circuit 2 by providing drive signals S261L, S262L received by the first and second low-side switches 261L, 262L. For controlling the input current Iac, the PFC control circuit 3 controls the duty cycle d26 of the switch acting as the control switch.

Figure 11:
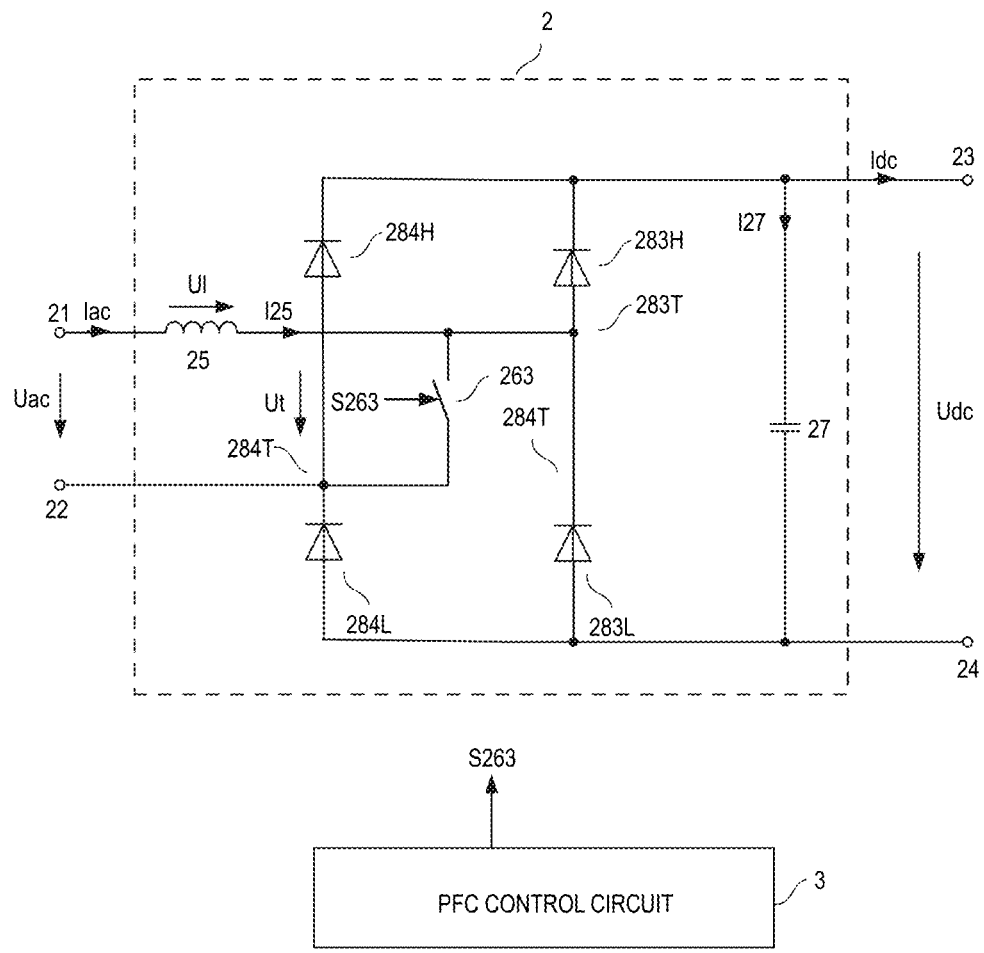

FIG. 11 shows a rectifier circuit 2 with a boost converter topology according to another example. The topology of the rectifier circuit 2 shown in FIG. 11 may be referred to as H4-PFC rectifier topology or double boost PFC rectifier with bidirectional switch topology.

In addition to the inductor 25 connected to the input 21, 22, the rectifier circuit 2 according to FIG. 11 includes two half-bridges that are each connected between the first output node 23 and the second output node 24. Each of these half-bridges includes two rectifier elements 283H, 283L, 284H, 284L connected in series between the first and second output nodes 23, 24. The rectifier elements 283H, 283L, 284H, 284L of each of the first and second half-bridges are connected to one another at a respective tap 283T, 284T, wherein the tap 283 of the first half-bridge is connected to the inductor 25 and the tap 284T of the second half-bridge is connected to one of the input nodes 21, 22. In the example shown in FIG. 11, the inductor 25 is connected to the first input node 21 and the tap 284T of the second half-bridge 283 is connected to the second input node 22.

The half-bridges may be implemented with passive rectifier elements such as, for example, pn diodes (as illustrated) or Schottky diodes (not illustrated). Additionally, a respective switch (not shown) may be connected in parallel with each of the rectifier elements 283H, 283L, 284H, 284L, wherein the switch is driven by a respective drive circuit (also not shown) in such a way that the switch switches on when the respective rectifier element is forward biased.

The rectifier elements are connected between the first and second output nodes 23, 24 and the taps 283T, 284T such that a high-side rectifier element 283H of the first half-bridge conducts when the electrical potential at the tap 283T is higher than the electrical potential at the first output node 23; the low-side rectifier element 283L of the first half-bridge conducts when the electrical potential at the second output node 24 is higher than the electrical potential at the tap 283T; a high-side rectifier element 284H of the second half-bridge when an electrical potential at the tap 284T is higher than the electrical potential at the first output node 23; and a low-side rectifier element 284L of the second half-bridge 283 conducts when the electrical potential at the second output node 24 is higher than the electrical potential at the tap 284T.

In addition to the first and second half-bridges, the rectifier circuit 2 includes a switch 263 that is connected between the taps 283T, 284T and that is controlled by the PFC control circuit 3 through a respective drive signal S263. The switch 263 is a bidirectionally blocking switch, for example. The switch 263 acts as a control switch, wherein the PFC control circuit, for controlling the input current Iac, adjusts the duty-cycle of the control switch 263.

Referring to FIG. 11, the PFC control circuit 3 is configured to control operation of the rectifier circuit 2 by providing a drive signal S263 received by switch 263. For controlling the input current Iac, the PFC control circuit 3 controls the duty cycle d26 of switch 263.

One example of the PFC control circuit 3 that is configured to control operation of the rectifier circuit 2 is explained with reference to FIGS. 12 and 13 in the following. It should be noted that these figures represent a functionality of the PFC control circuit 3 rather than a specific implementation. The PFC control circuit 3 may be implemented in various ways. According to one example, the PFC control circuit 3 is implemented using dedicated circuitry. According to another example, the PFC control circuit 3 includes a microcontroller and a memory that includes instructions (software) executed by the microcontroller.

Figure 12:
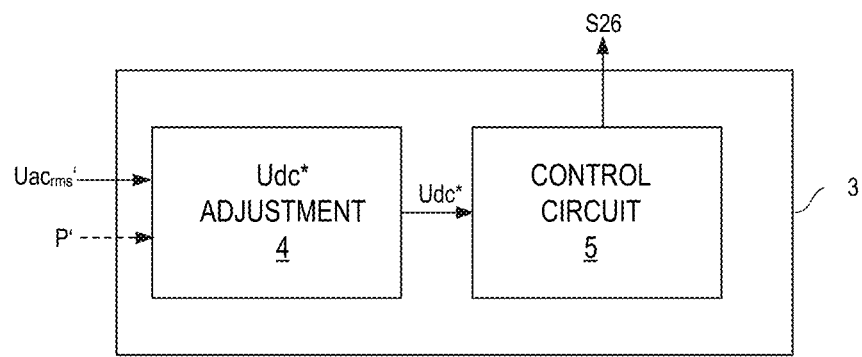
FIG. 12 illustrates one example of a PFC control circuit that includes an output voltage reference circuit 4 and a control circuit 5.

Referring to FIG. 12, the PFC control circuit 3 includes an output voltage reference circuit 4 that is configured to output the output voltage reference Udc*. According to one example, the output voltage reference circuit 4 is configured to calculate the output voltage reference Udc* in accordance with any one of equations (18a), (18b), and (19). For this, the output voltage reference circuit 4 receives a measured RMS value $Uac_{rms}'$, which is obtained by measuring the input voltage Uac and represents the RMS value of the input voltage Uac. Optionally, the output voltage reference circuit 4 further receives a measured power P'. The measured power P' represents the average input power $Pac_{avg}$ or the output power Pdc and is obtained by measuring the input power Pac or the output power Pdc. Information on the switching frequency fsw and the inductance are included in the output voltage reference circuit 4.

The output voltage reference circuit 4 may include any kind of circuit that is configured to provide the output voltage reference Udc* dependent on the measured RMS value $Uac_{rms}'$ and the measured power P' in accordance with any one of equations (18a), (18b), and (19). This circuit may include a look-up table, a calculation circuit, or the like.

Referring to FIG. 12, a control circuit 5 receives the output voltage reference Udc* and is configured to control operation of the rectifier circuit 2 by generating at least one drive signal S26. Drive signal S26 in FIG. 12 represents any one of the drive signals S26H, S26L illustrated in FIG. 9, S261l, S262L illustrated in FIG. 10, or S263 illustrated in FIG. 11 for driving the respective switch(es).

Figure 13:
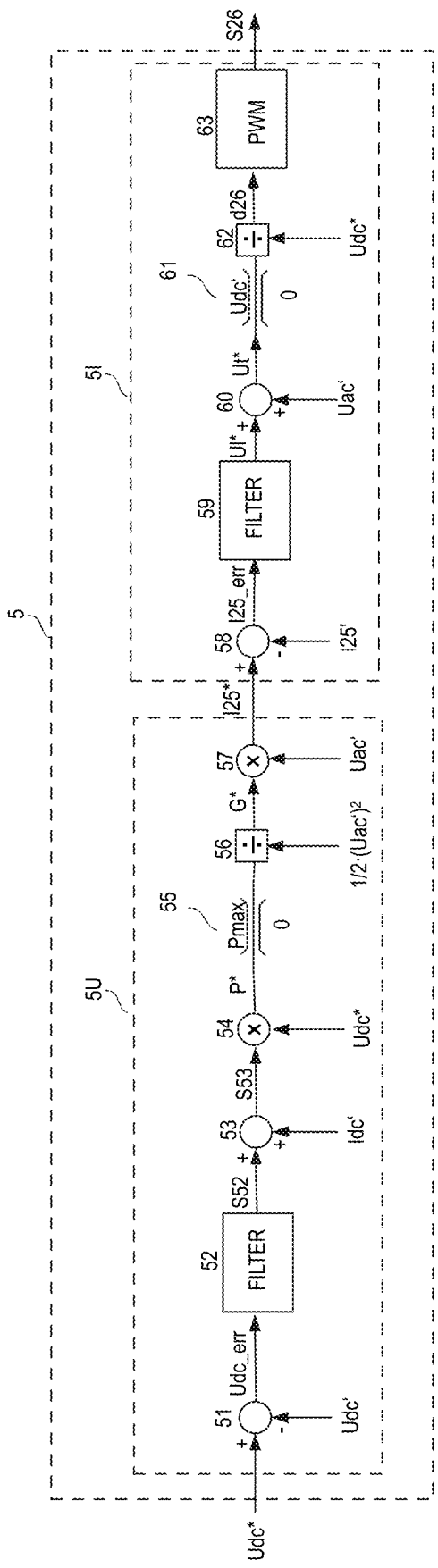
FIG. 13 illustrates one example of the control circuit in detail.

FIG. 13 illustrates one example of the control circuit 5 in greater detail. It should be noted that the control circuit 5 according to FIG. 13 is only an example. Basically, any kind of control circuit may be used that is configured to control operation of a rectifier circuit in a PFC rectifier in a PFC mode such that an output voltage is in accordance with an output voltage reference.

The control circuit 5 according to FIG. 13 includes an output voltage controller (output voltage regulator) 5U that receives the output voltage reference Udc* and a measured output voltage Udc' and is configured to provide an inductor current reference I25*. The measured output voltage Udc' represents the instantaneous voltage level of the output voltage Uac and can be obtained by measuring the output voltage Uac using any kind of voltage measurement circuit. The inductor current reference I25* represents a desired current through the inductor 25.

Furthermore, the control circuit 5 includes a current controller 5I that receives the inductor current reference I25* and a measured inductor current I25' and is configured to generate the drive signal S26 for controlling the control switch. The measured inductor I25' represents the instantaneous current level of the inductor current I25' and can be obtained by measuring the inductor current I25 using any kind of current measurement circuit. According to one example, the measured inductor I25' current represents an average of the instantaneous current level of the inductor current I25' during one drive cycle of the switch 26.

Referring to FIG. 13, the output voltage controller 5U includes a subtractor 51 that subtracts a measured output voltage Udc' from the output voltage reference Udc* and provides an error signal Udc_err that represents a difference between the output voltage reference Udc* and the measured output voltage Udc'.

A filter (regulator) 52 receives the error signal Ucd_err and provides a filter output signal S52 based on the error signal Ucd_err. Filter (regulator) 52 has one of a proportional (P), proportional-integral (PI), or proportional-integral-derivative (PID) characteristic, for example. The filter output signal S52 represents a current I27 (see FIGS. 9, 10, 11) into the output capacitor 27.

An adder 53 adds a measured output current Idc' to the filter output signal S52 and provides an adder output signal S53. The adder output signal S53 represents the overall current of the rectifier circuit 2, that is, the current through the inductor 25. The measured output current Idc' represents the instantaneous current level of the output current Idc and can be obtained by measuring the output current Idc Uac using any kind of current measurement circuit.

A multiplier 54 multiplies the adder output signal S53 with the output voltage reference Udc*. An output signal P* of the multiplier represents a power reference P*, wherein power reference P* represents a desired output power Pdc or a desired average input power. An optional limiter 55 limits the power reference P* such that the power reference P* does not exceed the maximum power Pmax.

Furthermore, a divider 56 receives the power reference P* and divides the power reference by ½(Uac')², where Uac' denotes the measured amplitude of the input voltage Uac, wherein the measured amplitude Uac' represents the amplitude of the input voltage Uac and may be obtained by measuring the input voltage Uac. An output signal G* of the divider represents a desired conductance of the rectifier circuit 2.

A further multiplier 57 multiplies the desired conductance G* with the measured input voltage Uac'. The measured input voltage Uac' represents the instantaneous voltage level of the input voltage Uac and can be obtained by measuring the input voltage Uac using any kind of voltage measurement circuit. An output signal of the further multiplier 57 represents the inductor current reference I25*.

Referring to FIG. 13, the current controller 5I that is configured to regulate the inductor current 25I includes a further subtractor 58 that is configured to subtract the measured inductor current I25' from the inductor current reference I25* to provide an error signal I25_err that represents a difference between the inductor current reference I25* and the measured inductor current I25'.

A further filter (regulator) 59 receives the current error signal I25_err and provides a filter output signal S59 based on the current error signal I25_err. Further filter (regulator) 59 has one of a proportional (P), proportional-integral (PI), or proportional-integral-derivative (PID) characteristic, for example. The filter output signal S59 represents an inductor voltage reference Ul*, which is a desired voltage Ul across the inductor 25.

An adder 60 adds the inductor voltage reference Ul* and the measured input voltage Uac', wherein an adder output signal represents a switch node voltage reference Ut*, which is a desired voltage level of a voltage Ut at the circuit node between the inductor 25 and the control switch. An optional limiter 56 limits the switch node voltage reference Ut* such that the switch node voltage reference Ut* does not exceed the measured input voltage Udc'.

In each of the rectifier circuits according to FIGS. 9-11, for example, the switch node voltage Ut is adjusted by a switched-mode operation of the control switch. The switch node voltage Ut is zero when the control switch is in the on-state and the switch node voltage Ut essentially equals the output voltage Udc when the control switch is in the off-state. Thus, the (average) switch node voltage Ut is given by the duty cycle d26 of the control switch multiplied with the output voltage Udc, $$Ut = d26 \cdot Udc \qquad (21).$$

Referring to FIG. 13, considering equation (21), the duty-cycle d26 is obtained by dividing the switch node voltage reference Ut* by the measured output voltage Udc' by a divider 62.

Furthermore, a PWM modulator 63 receives the duty-cycle d26 and is configured to generate the drive signal S26 for controlling the control switch. In the examples according to FIGS. 9 and 10, for example, the control switch changes when the polarity of the input voltage Uac changes. Thus, the PWM modulator 63 may receive the measured input voltage Uac' in order to decide which of the switches (S26L or S26H in FIG. 9 or S261L or S262L in FIG. 10) is the control switch at the respective time instance.

Figure 14:
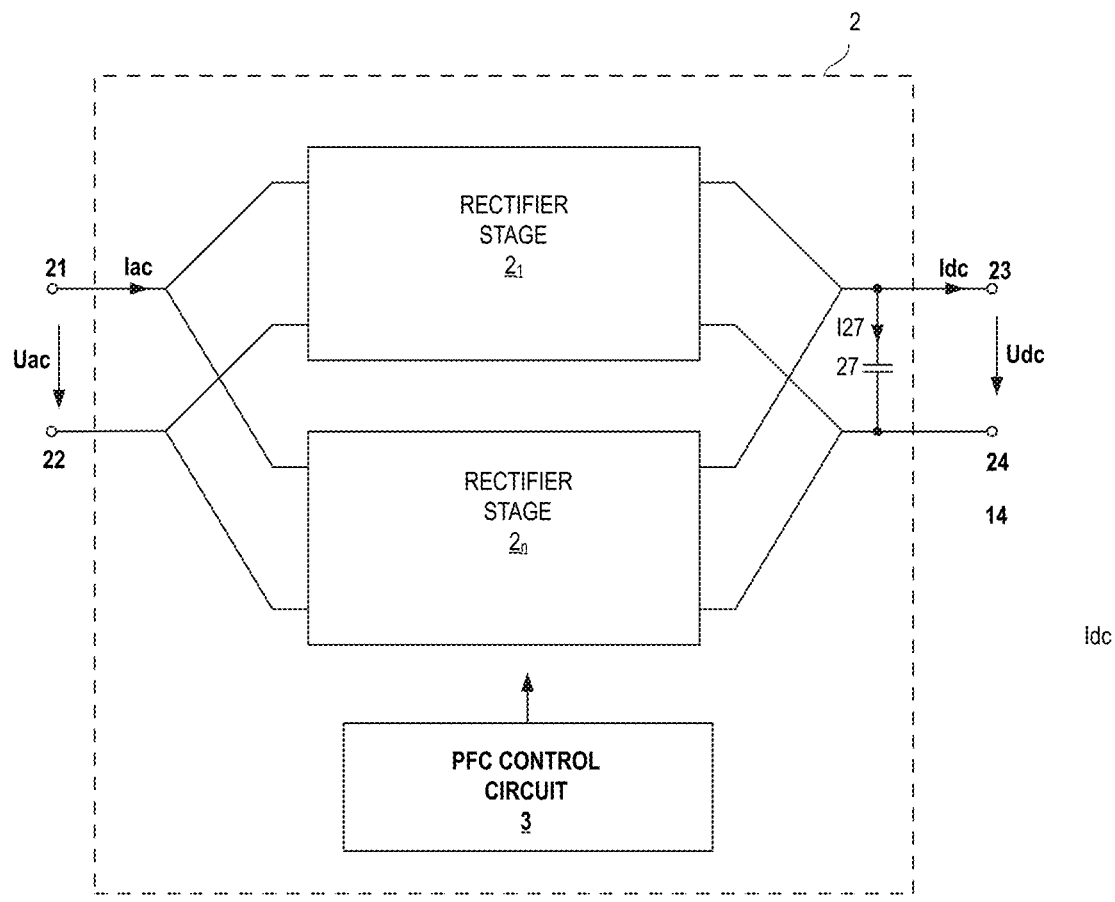
FIG. 14 illustrates a rectifier circuit according to another example.
Figure 15:
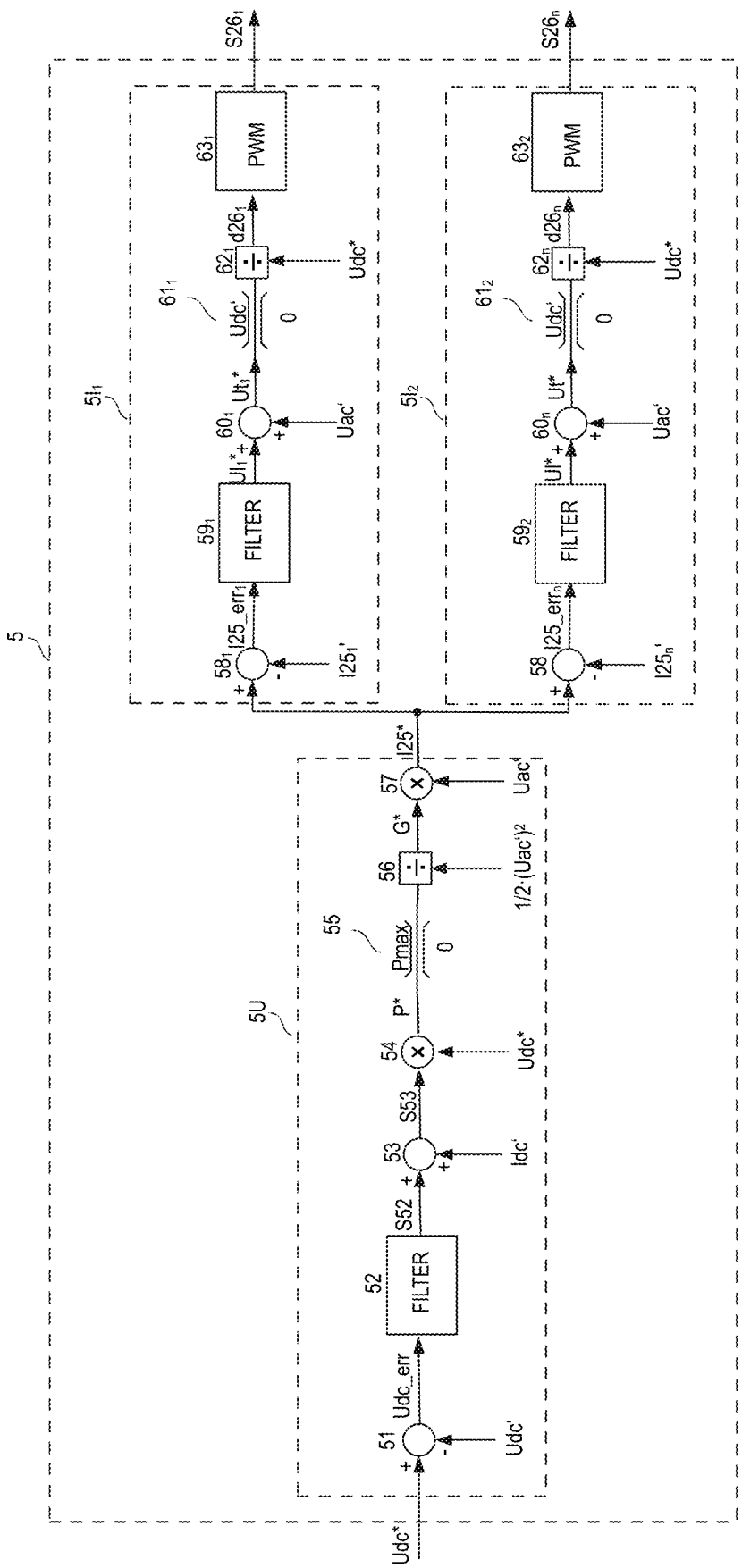
FIG. 15 illustrates one example of a control circuit that is configured to control operation of the rectifier circuit according to FIG. 14.
Figure 16:
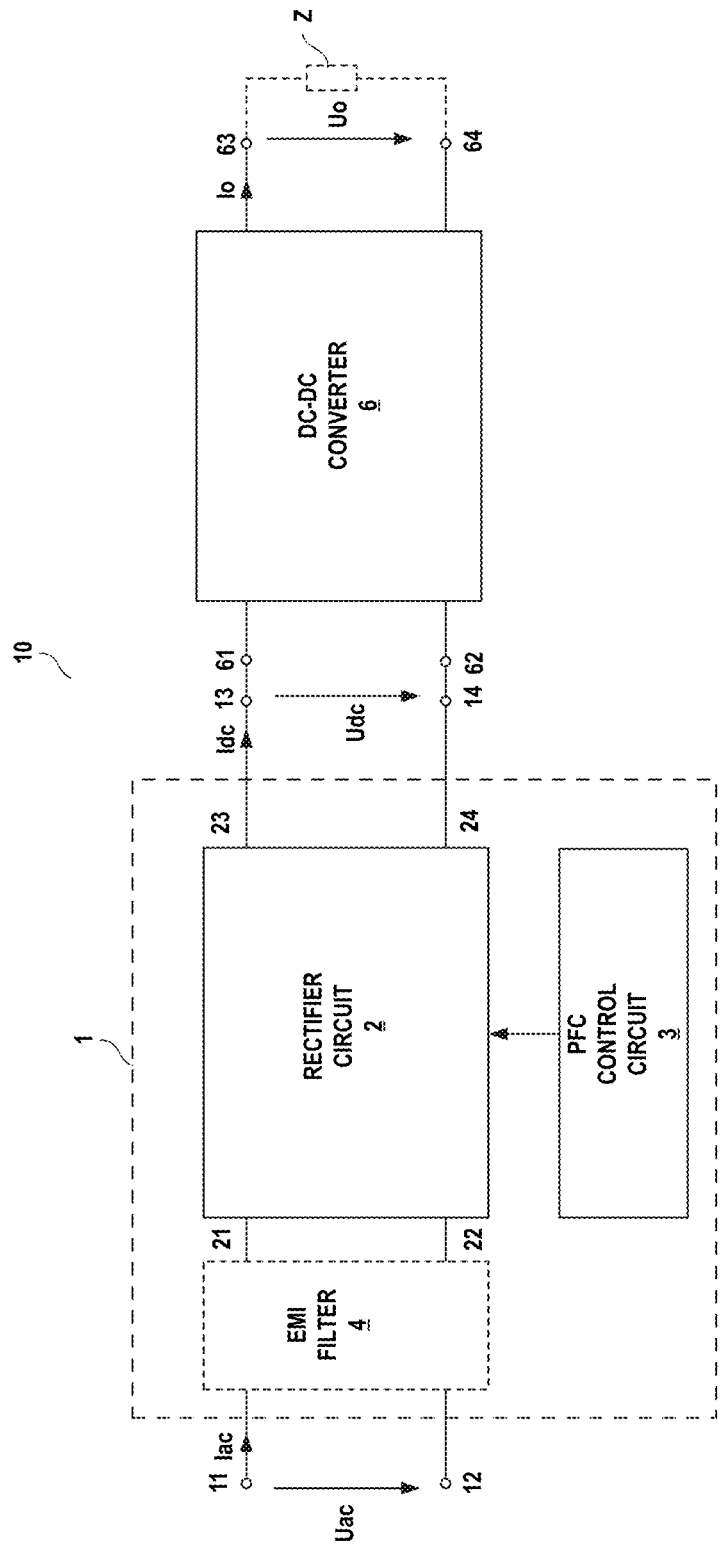
FIG. 16 illustrates one example of a power converter circuit that includes a DC-DC converter connected downstream the PFC rectifier.

FIG. 16 illustrates a rectifier circuit 2 according to another example. The rectifier circuit 2 according to FIG. 14 includes several rectifier circuit stages $2_1$, $2_n$ that are connected in parallel between the input 21, 22 and the output 23, 24. According to one example, each of these rectifier stages 21, 22 is in accordance with one of the examples illustrated in FIGS. 9-11, wherein the rectifier stages $2_1$, $2_n$ share the output capacitor 27. Just for the purpose of illustration, the rectifier circuit 2 according to FIG. 2 includes two rectifier stages $2_1$, $2_n$ connected in parallel. This, however, is only an example. It is also possible to implement the rectifier circuit 2 with more than two rectifier stages $2_1$, $2_n$ connected in parallel.

In this example, the PFC control circuit 3 is configured to control operation of both rectifier stages $2_1$, $2_n$. The PFC control circuit 3 may be implemented as explained with reference to FIG. 12 and include an output voltage reference circuit 4 that is configured to provide the output voltage reference Udc*. The output voltage reference circuit 4 may be configured to generate the output voltage reference Udc* in accordance with one of equations (18a), (18b), (18c), wherein Pmax in equations (18a) and (18b) is the maximum power of one rectifier stage 21, 2, and P in equation (19) is the power of one converter stage. According to one example, the rectifier stages $2_1$, $2_n$ are implemented with identical components and operated such that each converter stage $2_1$, $2_n$ provides an equal share of 1/n of the overall output power of the PFC rectifier, wherein n denotes the number of rectifier stages connected in parallel.

The power P according to equation (19) may be obtained by measuring the average input power or the output power of one of the converter stages $2_1$, $2_n$, or may be obtained by measuring an overall average input power or an overall average output power of the rectifier circuit 2 and dividing the measurement result by n.

Furthermore, the PFC control circuit 5 may include a control circuit 5 of the type explained with reference to FIG. 13. One example of such control circuit is illustrated in FIG. 16.

The control circuit 5 according to FIG. 16 is different from the control circuit according to FIG. 13 in that it includes n current controllers $5I_1$, $5I_n$ that each receive the inductor current reference I25* from the output voltage regulator 5U. Each of the current controllers $5I_1$, $5I_n$ is configured to generate a drive signal $S26_1$, $S26_n$ for the control switch in a respective one of the rectifier stage $2_1$, $2_n$.

Each of the current controllers $5I_1$, $5I_2$ may be implemented in the same way as the current controller 5I illustrated in FIG. 13. In FIG. 16, like signals and circuit elements as in the example shown in FIG. 13 are denoted with the same reference numbers, wherein subscript "1" has been added to the signals and circuit elements of a first one $5I_1$ and subscript "2" has been added to the signals and circuit elements of a second one $5I_2$ of current the current controller $5I_1$, $5I_2$.

The current controllers $5I_1$, $5I_2$ are configured to operate the two rectifier stages $2_1$, $2_2$ at the same switching frequency fsw and may be configured to operate the rectifier stages $2_1$, $2_2$ in an interleaved fashion. The latter, however, is only an example.

According to one example illustrated in FIG. 16, the power converter circuit 10, in addition to the PFC rectifier 1, includes a DC-DC converter 6. The DC-DC converter 6 includes an input 61, 62, that is connected to the output 13, 14 of the PFC rectifier 1 and is configured to receive the output voltage Udc from the PFC rectifier 1. In the power converter circuit 10 according to FIG. 10, the output voltage Udc of the PFC rectifier 1 may also be referred to DC link voltage. The DC-DC converter 6 is configured to provide an output voltage Uo and an output current Io based on the DC link voltage Udc and the output current Idc (DC link current Idc) received from the PFC rectifier 1. Any type of isolated or non-isolated DC-DC converter may be used to implement DC-DC converter 6 according to FIG. 10. An "isolated" DC-DC converter is a DC-DC converter that includes a galvanic isolation between the input 61, 62 and the output 63, 64, wherein the galvanic isolation is provided by a transformer, for example. A "non-isolated" DC-DC converter is a DC-DC converter that does not include a galvanic isolation between the input 61, 62 and the output 63, 64.

The DC-DC converter 6 may be configured to provide a regulated output current Io based on the DC link voltage Udc and the DC link current Idc received from the PFC rectifier 1, or may be configured to provide a regulated output current Io based on the DC link voltage Udc or the DC link current Idc. A regulated output current Io may be used for charging a battery, for example. A regulated output voltage may be used for supplying any kind of DC load such as, for example, a monitor, a computer, or the like.

Figure 17:
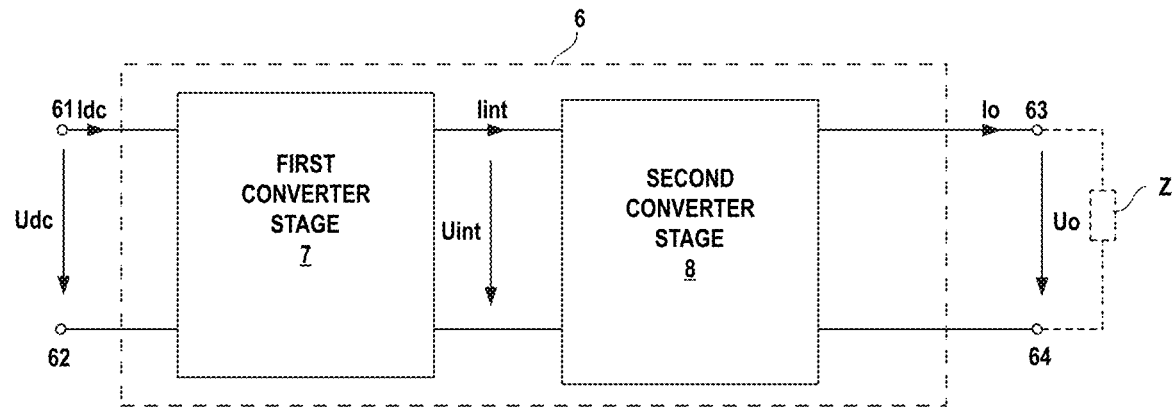
FIG. 17 illustrates one example of a DC-DC converter that includes two converter stages.

According to one example illustrated in FIG. 17, the DC-DC converter 6 includes a first converter stage 7 that is configured to receive the DC link voltage Udc and the DC link current Idc and generate an intermediate voltage Uint and an intermediate current Iint based on the DC link voltage and the DC link current Idc. Furthermore, the DC-DC converter 6 includes a second converter stage 8 that is configured to receive the intermediate voltage Uint and the intermediate current Iint from the first converter stage 7 and provide the output voltage Uo and the output current Io based on the intermediate voltage Uint and the intermediate current Iint.

According to one example, one of the first and second converter stages 7, 8 is a non-regulated converter stage and the other one of the first and second converter stages 7, 8 is a regulated converter stage.

According to one example, the first converter stage 7 is a non-regulated converter stage, that is, the first converter stage includes a non-regulated converter. The non-regulated converter may be configured to generate the intermediate voltage Uint such that a voltage level of the intermediate voltage Uint is a fixed portion of the voltage level of the DC link voltage Udc, so that Uint/Udc=m/n, wherein m>1 and n>1. According to one example, each of m and n is an integer selected from between 2 and 10, for example. According to one example, m and n are selected such that the first converter stage 7 is a buck stage, so that DC-DC Uint/Udc<1. According to one example, the first converter stage 7 includes an isolated resonant converter.

The second converter stage 8 includes a buck converter with a non-isolated topology, for example. According to one example, the second converter stage 8 includes a regulated converter, so that either the output current Io or the output voltage Uo is regulated. The output voltage Vo is selected from between 5V and 50V, in particular, fro, between 10V and 30V, for example.

Figure 18:
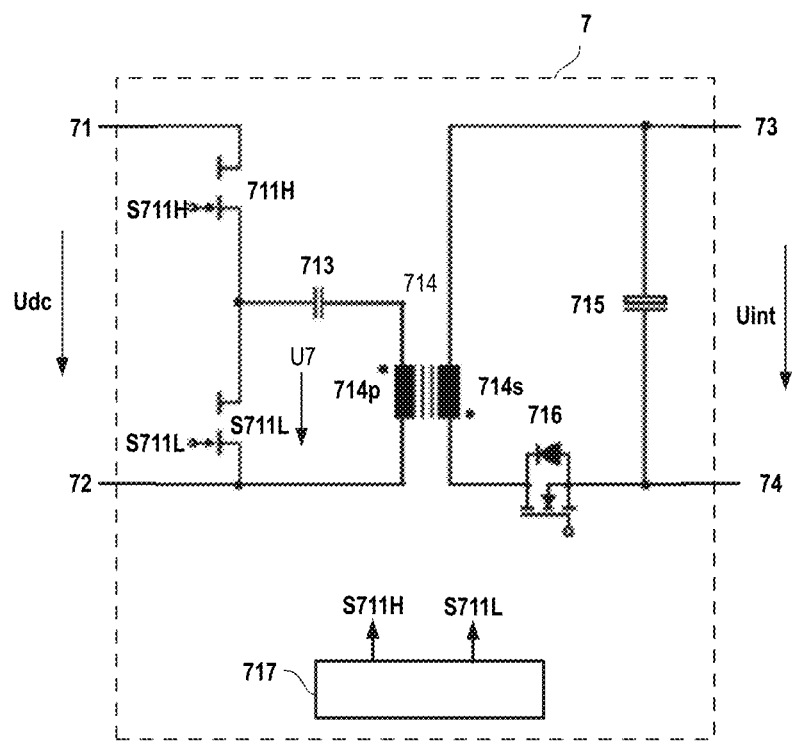

FIG. 18 illustrates one example of the first converter stage 7. In this example, the first converter stage 7 includes a hybrid flyback converter, which is one example of a resonant converter. The hybrid flyback converter according to FIG. 18 includes a half-bridge with a high-side switch 711H and a low-side switch 711L connected between a first input node 71 and a second input node 72 of the first converter stage 7. The circuit symbols of the high-side and low-side switches 711H, 711L in FIG. 12 represent HEMTs such as GaN-HEMTs. This, however, is only an example. The high-side and low-side switch 711H, 711L of the half-bridge may be implemented using any kind of conventional electronic switch. The half-bridge 711H, 711L is controlled by a control circuit 717 that generates drive signals S711H, S711L received by the high-side and low-side switches 711H, 711L.

According to one example, the control circuit 717 operates the half-bridge 711H, 711L at a fixed switching frequency such that a voltage U7 with a rectangular signal waveform and a fixed frequency is generated across the low-side switch 711L. A series circuit including a capacitor 713 and a primary winding 714p of a transformer 714 is connected in parallel with the low-side switch 711L and receives the rectangular voltage U7.

Furthermore, the hybrid flyback converter includes a secondary winding 714s of the transformer 714, wherein the secondary winding 714s is inductively coupled with the primary winding 714p. A rectifier circuit 715, 716 is connected in parallel with the secondary winding 714s. The rectifier circuit includes a capacitor 715 and a rectifier element 716 connected in series with the capacitor 715. The intermediate voltage Uint is available across the capacitor 715. The rectifier element 716 may be an active rectifier element (as illustrated) or a passive rectifier element.

In the hybrid flyback converter according to FIG. 18, a ratio between a voltage level of the DC link voltage Udc and the intermediate voltage Uint is dependent on a winding ratio of the transformer 714. The primary winding 714p and the secondary winding 714s have opposite winding senses in the hybrid flyback converter.

Furthermore, the hybrid flyback converter includes an output capacitor 715 connected between the output nodes 73, 74.

Figure 19:
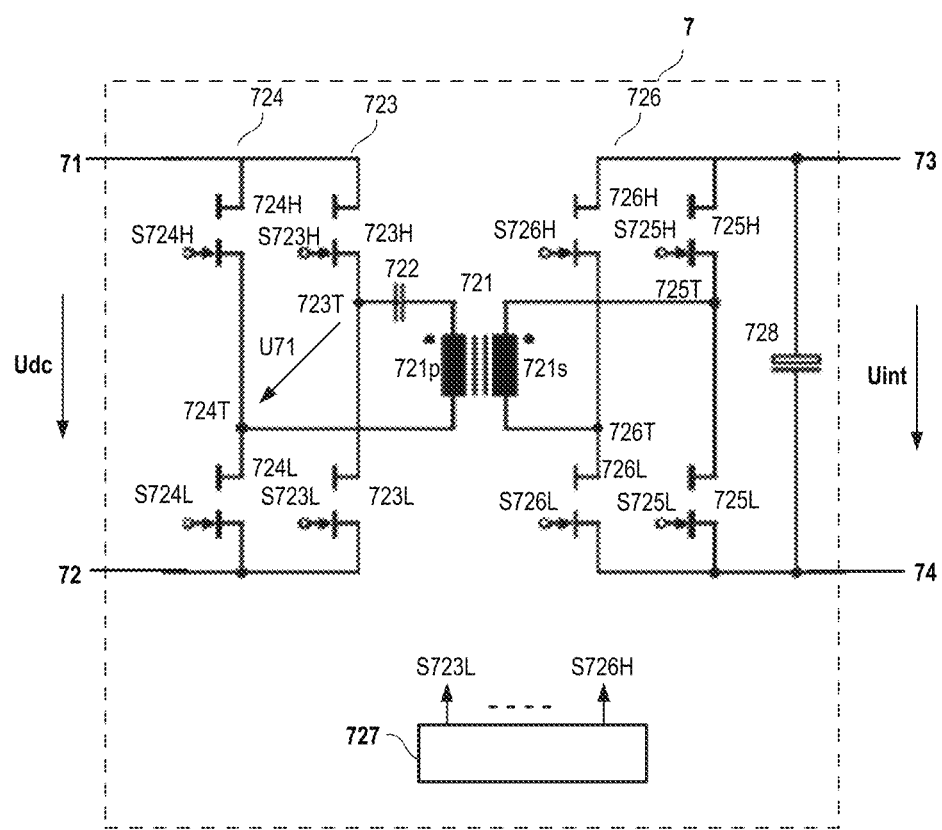

FIG. 19 illustrates another example of a resonant converter. In this example, the resonant converter includes a transformer 721 with a primary winding 721p and the secondary winding 721s, wherein the primary winding 721p and the secondary winding 721s have the same winding sense and are inductively coupled. A capacitor 722 is connected in series with the primary winding 721p.

Referring to FIG. 19, a series circuit including the primary winding 721p and the capacitor 722 is coupled to the input 71, 72 via a first full-bridge circuit that includes two half-bridges 723, 724. More specifically, a first circuit node of the series circuit is connected to a tap 723T of a first half-bridge and a second circuit node of the series circuit is connected to a tap 724T of a second half-bridge 724. Each of the first and second half-bridges includes a high-side switch 723H, 724H and a low-side switch 723L, 724L that are connected at the tap 723T, 724T and is connected between the input nodes 71, 72.

The first and second half-bridges 723, 724 are controlled by a control circuit 727 that generates drive signals S723H, S723L, S724H, S724L for the high-side and low-side switches of the half-bridges 723, 724. According to one example, the control circuit 727 is configured to control operation of the full-bridge such that an alternating voltage that alternates between +Udc and −Udc is generated based on the DC link voltage Udc across the series circuit with the capacitor 722 and the primary winding 721p.

The secondary winding 721s is connected to the output 73, 74 through a second full-bridge with two half-bridges 725, 726. Each of the half-bridges 725, 726 is connected between the output nodes 73, 74 and includes a high-side switch 725H, 726H and a low-side switch 725L, 726L that are connected at a respective tap 725T, 726T. The secondary winding 721a is connected between the taps 725T, 726T of the half-bridges 725, 726.

The second full-bridge is operated by the control circuit 726 synchronously with the first full-bridge, so that the second full-bridge 727 acts as an active rectifier for generating the intermediate voltage Uint. The intermediate voltage Uint is available across an output capacitor 728.

Figure 20:
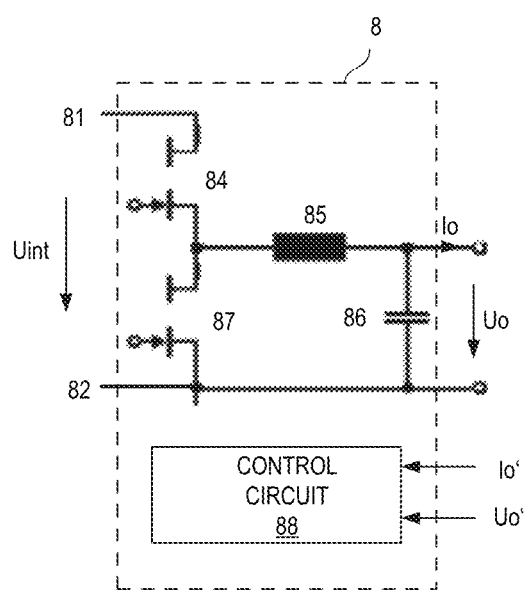
FIG. 20 illustrates one example of the second converter stage.

FIG. 20 illustrates one example of the second converter stage 8. In this example, the second converter stage 8 includes a buck converter. The buck converter includes a series circuit with an electronic switch 84, an inductor 85, and a capacitor 86, wherein the series circuit is connected between input nodes 81, 82 of the buck converter. The intermediate voltage Unit is available between the input nodes 81, 82. The output voltage Uo is available across the capacitor 86.

Furthermore, a rectifying element 87 is connected in parallel with a series circuit including the inductor 85 and the capacitor 86. The rectifier element may be an active rectifier element (as illustrated) or a passive rectifier element. Referring to FIG. 20, the electronic switch 84 and the active rectifier element may be implanted as HEMTs. This, however, is only an example. Any other kind of electronic switch may be used as well.

A control circuit 88 is configured to control operation of the electronic switch 84 dependent either on a measured the output current Io' or a measured output the output voltage Vo in order to either regulate the output current Io or the output voltage Vo. This is commonly known so that no further explanation is required in this regard.

Some of aspects described herein above are summarized with reference to numbered examples in the following.

Example 1. A method, including: operating a rectifier circuit in a PFC mode, wherein operating the rectifier circuit in the PFC mode includes: regulating an output voltage of the rectifier circuit, wherein regulating the output voltage includes operating a switch of the rectifier circuit at a fixed switching frequency, and wherein regulating the output voltage includes regulating the output voltage dependent on at least one operating parameter of the rectifier circuit such that the switch is operated under ZVS conditions.

Example 2. The method of example 1, wherein regulating the output voltage dependent on at least one operating parameter of the rectifier circuit such that the switch is operated under ZVS conditions includes: adjusting an output voltage reference dependent on the at least one operating parameter of the rectifier circuit; and regulating the output voltage of the rectifier circuit such that a voltage level of the output voltage is in accordance with the output voltage reference.

Example 3. A method, including: operating a rectifier circuit in a PFC mode, wherein operating the rectifier circuit in the PFC mode includes: adjusting an output voltage reference dependent on at least one operating parameter of the rectifier circuit; and regulating an output voltage of the rectifier circuit such that a voltage level of the output voltage is in accordance with an output voltage reference, and wherein regulating the output voltage comprises operating a switch of the rectifier circuit at a fixed switching frequency (fsw).

Example 4. The method according to example 1 or 3, wherein the at least one operating parameter includes an RMS value of an alternating input voltage received by the rectifier circuit.

Example 5. The method according to example 5, wherein the at least one operating parameter further includes one of an average input power or an output power of the rectifier circuit.

Example 6. The method according to any one of examples 1 to 5, wherein the rectifier circuit includes an inductor having an inductance, and wherein adjusting the output voltage reference further includes adjusting the output voltage reference dependent on the inductance and the fixed switching frequency.

Example 7. The method according to example 6, wherein operating the switch under ZVS conditions includes adjusting a duty-cycle of the switch in such a way that a current through the inductor crosses zero in each drive cycle of the switch.

Example 8. The method of any one of claims 1 to 7, wherein adjusting the output voltage reference (Udc*) includes adjusting the output voltage reference (Udc*) dependent on an RMS value of the input voltage (Uac) as follows, $$Udc^*(Uac_{rms}) = \frac{Uac_{rms}^3 \cdot \sqrt{2}}{Uac_{rms}^2 - P\max \cdot 2 \cdot fsw \cdot L},$$

where Pmax denotes one of the maximum average input power and the maximum output power of the rectifier circuit 2, $Uac_{rms}$ denotes the RMS value of the input voltage, fsw denotes the switching frequency, and L denotes an inductance of an inductor in the rectifier circuit.

Example 9. The method of any one of claims 1 to 7, wherein adjusting the output voltage reference (Udc*) includes adjusting the output voltage reference (Udc*)

dependent on an RMS value of the input voltage (Uac) as follows, $$Udc^*(Uac_{rms}) = p \cdot \frac{Uac_{rms}^3 \cdot \sqrt{2}}{Uac_{rms}^2 - Pmax \cdot 2\, fsw \cdot L},$$

where Pmax denotes one of the maximum average input power and the maximum output power of the rectifier circuit 2, $Uac_{rms}$ denotes the RMS value of the input voltage, fsw denotes the switching frequency, L denotes an inductance of an inductor in the rectifier circuit, and p denotes a proportionality factor, wherein 1<p<1.2.

Example 10. The method of any one of claims 1 to 7, wherein adjusting the output voltage reference (Udc*) includes adjusting the output voltage reference (Udc*) dependent on an RMS value of the input voltage (Uac) and one of the average input power $Pac_{avg}$ and the output power Pdc as follows, $$Udc^*(Uac_{rms}, P) = q \cdot \frac{Uac_{rms}^3 \cdot \sqrt{2}}{Uac_{rms}^2 - P \cdot 2 \cdot fsw \cdot L},$$

where P denotes one of the average instantaneous input power $Pac_{avg}$ and the instantaneous output power Pdc, $Uac_{rms}$ denotes the RMS value of the input voltage, fsw denotes the switching frequency, L denotes an inductance of an inductor in the rectifier circuit, and q denotes a proportionality factor, wherein 1<q<1.2.

Example 11. The method according to any one of examples 1 to 10, wherein the rectifier circuit includes two rectifier stages connected in parallel, and wherein regulating the output voltage includes operating a switch in each of the rectifier stages at the same fixed switching frequency.

Example 12. The method according to any one of examples 1 to 11, further including: converting the output voltage of the PFC rectifier into a fixed further output voltage or a fixed output current by a DC-DC converter.

Example 13. The method according to example 12, wherein the DC-DC converter includes a first converter stage and a second converter stage, wherein one of the first and second converter stages is a regulated converter stage and the other one of the first and second converter stages is a non-regulated converter stage.

Example 14. The method of any one of the preceding examples, wherein the RMS value of the input voltage ranges between 90 Vrms and 265 Vrms.

Example 15. The method of any one of the preceding examples, wherein the output voltage reference is adjusted to be within 210V and 400V.

Example 16. A PFC control circuit configured to operate a rectifier circuit in a PFC mode, wherein, to operate the rectifier circuit in the PFC mode, the control circuit is configured to adjust an output voltage reference dependent on at least one operating parameter of the rectifier circuit; and regulate an output voltage of the rectifier circuit such that a voltage level of the output voltage is in correspondence with an output voltage reference, and wherein the control circuit, to regulate the output voltage, is configured to operate a switch of the rectifier circuit at a fixed switching frequency.

Example 17. A power converter circuit, including: a PFC control circuit according to example 16; and a rectifier circuit controlled by the PFC control circuit.

Example 18. The power converter circuit according to example 76, further including: a DC-DC converter connected downstream the PFC rectifier.

Example 19. The power converter circuit according to example 17, wherein the DC-DC converter includes a first converter stage and a second converter stage, wherein one of the first and second converter stages is a regulated converter stage and the other one of the first and second converter stages is a non-regulated converter stage.

The invention claimed is:

1. A method comprising:
operating a rectifier circuit in a PFC (Power Factor Correction) mode, wherein operating the rectifier circuit in the PFC mode comprises: regulating an output voltage of the rectifier circuit, wherein regulating the output voltage comprises switching a switch of the rectifier circuit at a fixed switching frequency; and
wherein regulating the output voltage further comprises, during operation of switching the switch of the rectifier circuit at the fixed switching frequency, regulating the output voltage with respect to an output voltage reference, the output voltage reference derived from at least one operating parameter of the rectifier circuit such that the switch is operated under ZVS (Zero Voltage Switching) conditions.

2. The method as in claim 1, wherein regulating the output voltage comprises:
adjusting a magnitude of the output voltage reference dependent on the at least one operating parameter of the rectifier circuit; and
regulating the output voltage of the rectifier circuit such that a magnitude of the output voltage is generated with respect to the adjusted output voltage reference.

3. The method according to claim 2, wherein the rectifier circuit includes an inductor having an inductance; and
wherein adjusting the output voltage reference further comprises adjusting the output voltage reference dependent on a magnitude of the inductance and a magnitude of the fixed switching frequency.

4. The method according to claim 3, wherein operating the switch under ZVS conditions comprises adjusting a duty-cycle of controlling the switch such that a magnitude of current through the inductor crosses a zero reference multiple times in each drive cycle of controlling the switch ON and OFF at the fixed switching frequency to convert an alternating input voltage inputted to the rectifier circuit into the output voltage.

5. The method according to claim 1, wherein the at least one operating parameter comprises an RMS (Root Mean Square) value of an alternating input voltage supplied to the rectifier circuit;
wherein the rectifier circuit is operative to convert the alternating input voltage into the output voltage; and
wherein the output voltage is a DC output voltage.

6. The method according to claim 5, wherein the at least one operating parameter further includes a metric indicating an average input power supplied by the alternating input voltage to the rectifier circuit; and
wherein the output voltage reference is derived based on a combination of a magnitude the RMS value of the alternating input voltage and a magnitude of the average input power.

7. The method according to claim 5, wherein the at least one operating parameter includes an output power of the rectifier circuit.

8. The method according to claim 1, wherein the rectifier circuit includes two rectifier stages connected in parallel; and
wherein regulating the output voltage comprises operating a respective switch in each of the rectifier stages at a same fixed switching frequency.

9. The method according to claim 1 further comprising: converting the output voltage of the rectifier circuit into a fixed output voltage or a fixed output current via a DC-DC converter coupled to the rectifier circuit.

10. The method according to claim 9, wherein the DC-DC converter comprises a first converter stage and a second converter stage,
wherein the first converter stage is a regulated converter stage and the second converter stage is a non-regulated converter stage.

11. The method of claim 1, wherein a RMS (Root Mean Square) value of an alternating input voltage inputted to the rectifier circuit ranges between 90 Volts RMS and 265 Volts RMS, the rectifier circuit operative to convert the alternating input voltage into the output voltage.

12. The method of claim 1, wherein the output voltage reference is adjusted to be within 210V and 400V.

13. The method as in claim 1, wherein Udc represents the output voltage;
wherein Udc* represents the output voltage reference, the method further comprising:
adjusting the output voltage reference (Udc*) as follows:

$$Udc^*(Uac_{rms}) = \frac{Uac_{rms}^3 \cdot \sqrt{2}}{Uac_{rms}^2 - P\max \cdot 2 \cdot fsw \cdot L'},$$

where Pmax denotes a maximum output power of the rectifier circuit, where $Uac_{rms}$ denotes an RMS value of an input voltage supplied to the rectifier circuit, where fsw denotes a magnitude of the switching frequency, and L' denotes an inductance of an inductor in the rectifier circuit; and
when the rectifier circuit is operative to convert the input voltage into the output voltage.

14. The method as in claim 1, wherein the output voltage reference is represented by Udc*;
wherein Uac represents an input voltage supplied to the rectifier circuit, the rectifier circuit operative to convert the input voltage into the output voltage;
the method further comprising: adjusting the output voltage reference Udc* dependent on an RMS (Root Mean Square) setting of the input voltage as follows:

$$Udc^*(Uac_{rms}) = p \cdot \frac{Uac_{rms}^3 \cdot \sqrt{2}}{Uac_{rms}^2 - P\max \cdot 2 \cdot fsw \cdot L'},$$

where Pmax denotes a maximum input power of the rectifier circuit, $Uac_{rms}$ denotes an RMS setting of the input voltage Uac, fsw denotes a magnitude of the switching frequency, L' denotes an inductance of an inductor in the rectifier circuit, and p denotes a proportionality factor, wherein 1<p<1.2.

15. A PFC (Power Factor Correction) control circuit configured to operate a rectifier circuit in a PFC mode, wherein, to operate the rectifier circuit in the PFC mode, the control circuit is-operative to:
adjust an output voltage reference dependent on at least one operating parameter of the rectifier circuit;
convert an input voltage received by the rectifier circuit into an output voltage;
regulate a magnitude of the output voltage of the rectifier circuit with respect to the adjusted output voltage reference; and
wherein the control circuit, to regulate the output voltage, is configured to operate a switch of the rectifier circuit at a fixed switching frequency.

16. A power converter circuit comprising:
the PFC control circuit according to claim 15; and
the rectifier circuit controlled by the PFC control circuit.

17. The power converter circuit according to claim 16 further comprising:
a DC-DC converter connected to the PFC rectifier, the DC-DC converter operative to receive the output voltage from the PFC rectifier.

18. The power converter circuit according to claim 16, wherein the DC-DC converter comprises a first converter stage and a second converter stage,
wherein the first converter stage is a regulated converter stage and the second converter stage is a non-regulated converter stage.

19. An apparatus comprising:
a PFC (Power Factor Correction) control circuit operative to:
monitor operation of a rectifier circuit, the rectifier circuit operative to convert an input voltage into an output voltage based on an output voltage reference;
adjust the output voltage reference depending on the monitored operation of the rectifier circuit; and
via the rectifier circuit, regulate the output voltage with respect to the adjusted output voltage reference, regulation of the output voltage including switching of a switch in the rectifier circuit at a fixed switching frequency, wherein switching of the switch at the fixed switching frequency is operative to convert the input voltage into the output voltage.

20. The apparatus as in claim 19, wherein the PFC control circuit is further operative to:
via the monitored operation of the rectifier circuit, receive input indicating a magnitude of the input voltage inputted to the rectifier circuit, the input voltage being an alternating voltage; and
adjust a magnitude of the output voltage reference based on the magnitude of the input voltage.

21. The apparatus as in claim 20, wherein the PFC control circuit is further operative to:
via the regulation of the output voltage, adjust a duty cycle of switching the switch in the rectifier circuit between ON and OFF states.

22. The apparatus as in claim 19, wherein the PFC control circuit is further operative to:
via the monitored operation of the rectifier circuit: i) receive first input indicating a magnitude of the input voltage inputted to the rectifier circuit, the input voltage being an alternating voltage, and ii) receive second input indicating a magnitude of power supplied by the input voltage to the rectifier circuit; and
adjust a magnitude of the output voltage reference based on a combination of the magnitude of the input voltage and the magnitude of the power supplied by the input voltage.

23. The apparatus as in claim 22, wherein the PFC control circuit is further operative to:
during the regulation of the output voltage, adjust a duty cycle of switching the switch in the rectifier circuit between ON and OFF states based on a magnitude of the output voltage with respect to the magnitude of the output voltage reference, the adjusted duty cycle of switching the switch operative to control a magnitude of input current supplied by the input voltage to the rectifier circuit, the controlled magnitude of the input current operative to maintain the magnitude of the output voltage with respect to the output voltage reference.

24. The apparatus as in claim 23, wherein the switch is controlled via zero voltage switching with respect to the magnitude of the input current to the rectifier circuit as supplied from the input voltage, where a magnitude of the input voltage crosses a zero threshold twice during each control cycle of switching the switch at the fixed frequency.

25. The apparatus as in claim 19, wherein the PFC control circuit is operative to control the rectifier circuit such that an average input current supplied from the input voltage to the rectifier circuit is in phase with a magnitude the input voltage.

\* \* \* \* \*